(12) United States Patent
Li et al.

(10) Patent No.: US 10,591,975 B2
(45) Date of Patent: Mar. 17, 2020

(54) MEMORY ACCESS MANAGEMENT FOR LOW-POWER USE CASES OF A SYSTEM ON CHIP VIA SECURE NON-VOLATILE RANDOM ACCESS MEMORY

(71) Applicant: QUALCOMM INCORPORATED, San Diego, CA (US)

(72) Inventors: Yanru Li, San Diego, CA (US); Azzedine Touzni, Carlsbad, CA (US); Dexter Tamio Chun, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 278 days.

(21) Appl. No.: 15/798,116

(22) Filed: Oct. 30, 2017

(65) Prior Publication Data

US 2019/0129493 A1 May 2, 2019

(51) Int. Cl.
| | | |
|---|---|---|
| *G06F 1/32* | (2019.01) | |
| *G06F 1/3246* | (2019.01) | |
| *G06F 15/78* | (2006.01) | |
| *G06F 1/3234* | (2019.01) | |
| *G06F 9/4401* | (2018.01) | |
| *G06F 21/81* | (2013.01) | |
| *G06F 1/3287* | (2019.01) | |

(Continued)

(52) U.S. Cl.
CPC .......... *G06F 1/3246* (2013.01); *G06F 1/3243* (2013.01); *G06F 1/3287* (2013.01); *G06F 9/4403* (2013.01); *G06F 15/7817* (2013.01); *G06F 21/79* (2013.01); *G06F 21/81* (2013.01); *G06F 21/575* (2013.01)

(58) Field of Classification Search
CPC ..... G06F 1/32; G06F 1/28; G06F 1/26; G06F 9/44
See application file for complete search history.

(56) References Cited

U.S. PATENT DOCUMENTS

| | | | |
|---|---|---|---|
| 2003/0212871 A1 | 11/2003 | Suzuki et al. | |
| 2005/0076256 A1* | 4/2005 | Fleck | G06F 1/3203 |
| | | | 713/320 |

(Continued)

FOREIGN PATENT DOCUMENTS

EP    2302521 A1    3/2011

OTHER PUBLICATIONS

International Search Report and Written Opinion—PCT/US2018/052240—ISA/EPO—dated Jan. 30, 2019.

*Primary Examiner* — Jaweed A Abbaszadeh
*Assistant Examiner* — Keshab R Pandey
(74) *Attorney, Agent, or Firm* — Smith Tempel Blaha LLC

(57) ABSTRACT

Systems and methods are disclosed for managing memory access for low-power use cases of a system on chip. One such method comprises booting a system on chip (SoC) comprising a plurality of SoC processing devices. A trusted channel is created to a secure non-volatile random access memory (NVRAM). The method determines a power-saving software program to be executed on the SoC by one of the plurality of SoC processing devices. A software image associated with the power-saving software program is loaded to the secure NVRAM. In response to loading the software image to the secure NVRAM, each of the plurality of SoC processing devices except the one executing the software image from the secure NVRAM are powered down.

26 Claims, 22 Drawing Sheets

(51) Int. Cl.
 *G06F 21/79* (2013.01)
 *G06F 21/57* (2013.01)

(56) References Cited

U.S. PATENT DOCUMENTS

| | | | |
|---|---|---|---|
| 2012/0131253 A1* | 5/2012 | McKnight | G06F 1/30 710/308 |
| 2013/0290759 A1* | 10/2013 | Kumar | G06F 1/3275 713/323 |
| 2016/0055102 A1 | 2/2016 | De Cesare et al. | |
| 2016/0127351 A1* | 5/2016 | Smith | G06F 21/316 726/10 |
| 2016/0320826 A1* | 11/2016 | Taha | G11C 11/406 |

* cited by examiner

| STEP | OPERATION | SoC knows | SoC not know | NVRAM know | NVRAM not know | snooper know | snooper not know |
|---|---|---|---|---|---|---|---|
| 502 | public key modulus (variable) | p = 16 | | p = 16 | | p = 16 | |
| 504 | public key base (variable) | g = 5 | | g = 5 | | g = 5 | |
| 506 | private key exponent fused | a = 6 | b | b = 7 | a | | a, b |
| 508 | compute hash | A = g$^a$ mod p | | B = g$^b$ mod p | | | |
| 510 | compute hash | A = 5$^6$ mod 16 = 9 | | B = 5$^7$ mod 16 = 13 | | | |
| 512 | share hash | A = 9, B = 13 | | A = 9, B = 13 | | A = 9, B = 13 | a, b |
| 514 | compute secret key | s = B$^a$ mod p | | s = A$^b$ mod p | | | a, b, s |
| 516 | compute secret key | s = 13$^6$ mod 16 = 9 | | s = 9$^7$ mod 16 = 9 | | | a, b, s |
| 518 | SoC send password within encrypted message (U) protected with secret key (s) | U = s{password} | | | | U | a, b, s |
| 520 | NVRAM decrypts password using secret key (s) | | | password = s$^{-1}$(U) | | U | a, b, s, password |
| 522 | pass gate is unlocked if password sent by SoC matches value stored in NVRAM fuse | | | password match | | U | a, b, s, password |

*FIG. 5*

MEMORY ACCESS MANAGEMENT FOR LOW-POWER USE CASES OF A SYSTEM ON CHIP VIA SECURE NON-VOLATILE RANDOM ACCESS MEMORY

DESCRIPTION OF THE RELATED ART

Portable computing devices (e.g., cellular telephones, smart phones, tablet computers, portable digital assistants (PDAs), portable game consoles, wearable devices, and other battery-powered devices) and other computing devices continue to offer an ever-expanding array of features and services, and provide users with unprecedented levels of access to information, resources, and communications. To keep pace with these service enhancements, such devices have become more powerful and more complex. Portable computing devices now commonly include a system on chip (SoC) comprising a plurality of memory clients embedded on a single substrate (e.g., one or more central processing units (CPUs), a graphics processing unit (GPU), digital signal processors, etc.). The memory clients may read data from and store data in an external system memory (i.e., random access memory (RAM)) electrically coupled to the SoC via a high-speed bus.

Due to its relatively low cost and high capacity, volatile memory (e.g., dynamic RAM (DRAM) and static RAM (SRAM)) are widely used for external system memory in digital electronics, such as, portable computing devices. Despite these advantages, volatile memory devices consume relatively more power than non-volatile memory devices because the memory cells lose their contents after power is removed and, therefore, must be periodically refreshed. As non-volatile memory becomes more cost-effective, it may become a more viable solution for use as system memory in computing devices. Non-volatile RAM (NVRAM) contains non-volatile memory cells that (unlike DRAM and SRAM) retain their data after power is shut-off. While this may improve power efficiency, the data contained in NVRAM may be susceptible to unauthorized reading and/or writing.

For security and privacy purposes, some of the contents contained in the NV cells may be required to be tamper-proof. To provide this capability, existing solutions may employ encryption to ensure that the contents of the NV cells cannot be read and altered. All data read/written by a memory client is first de-encrypted/encrypted and then stored in the NV cells. However, de-encryption/encryption introduces latency into the read/write data path, which can reduce performance for upstream memory clients.

Another solution to the privacy/security concerns associated with NVRAM is to overwrite/erase the content of NVRAM upon power-down. The problem with this approach is that power is required to write the NVRAM and a bad power-down may not entirely complete the operation. Also, it may be advantageous to keep NVRAM contents intact so that the next device boot can benefit in speed from the non-volatile retention of content.

Accordingly, there is a need for improved systems and methods for providing secure access to NVRAM and which support various low-power use cases.

SUMMARY OF THE DISCLOSURE

Systems and methods are disclosed for managing memory access for low-power use cases of a system on chip. One such method comprises booting a system on chip (SoC) comprising a plurality of SoC processing devices. A trusted channel is created to a secure non-volatile random access memory (NVRAM). The method determines a power-saving software program to be executed on the SoC by one of the plurality of SoC processing devices. A software image associated with the power-saving software program is loaded to the secure NVRAM. In response to loading the software image to the secure NVRAM, each of the plurality of SoC processing devices except the one executing the software image from the secure NVRAM are powered down.

An embodiment of a system comprises a system on chip (SoC), a double data rate (DDR) memory, a secure non-volatile random access memory (NVRAM), and a lo-power use case management module. The SoC comprises a plurality of SoC processing devices. The DDR memory is electrically coupled to the SoC. The secure NVRAM has a fuse with a pass gate value for creating a trusted channel. The low-power use case management module is configured to determine a power-saving software program to be executed on the SoC by one of the plurality of SoC processing devices. The low-power use case management module is further configured to load a software image associated with the power-saving software program from the DDR memory to the secure NVRAM and, in response, initiate a powering down of each of the plurality of SoC processing devices except the one executing the software image from the secure NVRAM.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIG. 5 is a table illustrating an exemplary method of an encrypted password exchange between the SoC and the NVRAM of FIGS. 1, 2, and 4.

DETAILED DESCRIPTION

Figure 1:
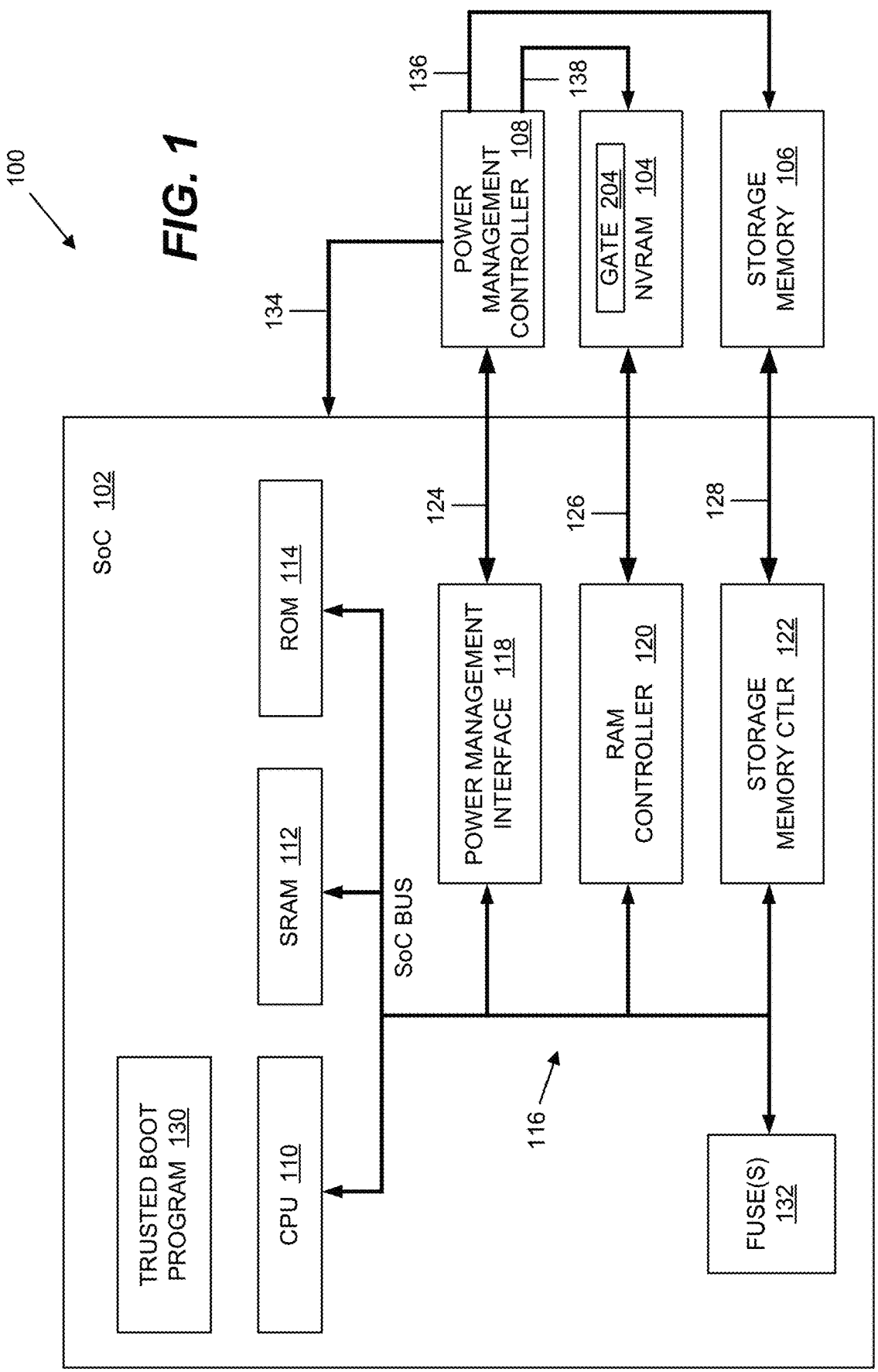
FIG. 1 is a block diagram of an embodiment of a system for providing secure access to a non-volatile random access memory (NVRAM).

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "portable computing device," "wireless device," "wireless telephone", "wireless communication device," and "wireless handset" are used interchangeably. With the advent of third generation ("3G"), fourth generation ("4G"), and fifth generation ("5G") wireless technologies, greater bandwidth availability has enabled more portable computing devices with a greater variety of wireless capabilities. Therefore, a portable computing device may include a cellular telephone, a pager, a PDA, a smartphone, a navigation device, an Internet of Things ("IoT") device, a wearable device, or a hand-held computer with a wireless connection or link.

In one example, the term "software image" may refer to the output of compiling and linking source code for a specific machine type. As known in the art, the output of compiling and linking the source code for a specific machine type may comprise the instructions (i.e., machine operation code) and data structure(s) that may be required for execution on that type of machine. In the context of mobile devices, an embedded software image, such as a boot loader, may be programmed into, for example, flash storage during a factory provision stage. Mobile application software images may be downloaded to the storage device by an end user.

FIG. 1 illustrates an embodiment of a system 100 for providing secure access to a non-volatile random access memory (NVRAM). The system 100 comprises a system on chip (SoC) 102 electrically coupled to a tamper/snoop-resistant NVRAM 104 via a high-speed bus 126. NVRAM 104 may comprise any desirable type of non-volatile memory that retains NV cell content when power is removed (e.g., spin-transfer torque magnetic random-access memory (STT-RAM), phase-change RAM (PC-RAM), resistive RAM (RE-RAM), etc.). As described below in more detail in connection with FIGS. 2-6, NVRAM 104 comprises a gate mechanism 204 that generally includes functionality for preventing read/write operations from accessing a NV cell array 202 unless a successful authentication or password exchange occurs between the SoC 102 and the NVRAM 104.

It should be appreciated that system 100 may be implemented in any computing device, including a personal computer, a workstation, a server, a portable computing device (PCD), such as a cellular telephone, a smartphone, a portable digital assistant (PDA), a portable game console, a navigation device, a tablet computer, a wearable device, such as a sports watch, a fitness tracking device, etc., or other battery-powered, web-enabled devices.

The SoC 102 comprises various on-chip components, including a central processing unit (CPU) 110, a static random access memory (SRAM) 112, read only memory (ROM) 114, a RAM controller 120, a storage memory controller 122, a power management interface 118, and fuses 132 electrically coupled via SoC bus 116. RAM controller 120, which is electrically coupled to NVRAM 104 via high-speed bus 126, controls communications with NVRAM 104. Storage memory controller 122, which is electrically coupled to external storage memory 106 via bus 128, controls communication with storage memory 106.

Power management interface 118 is electrically coupled to a power manager controller 108 via a connection 124. Power manager controller 108 controls the power supplied to various system components. As illustrated in FIG. 1, power is supplied to SoC 102, NVRAM 104, and storage memory 106 via connections 134, 138, and 136, respectively. System 100 further comprises a power source (e.g., a battery), which is not shown.

Figure 2:
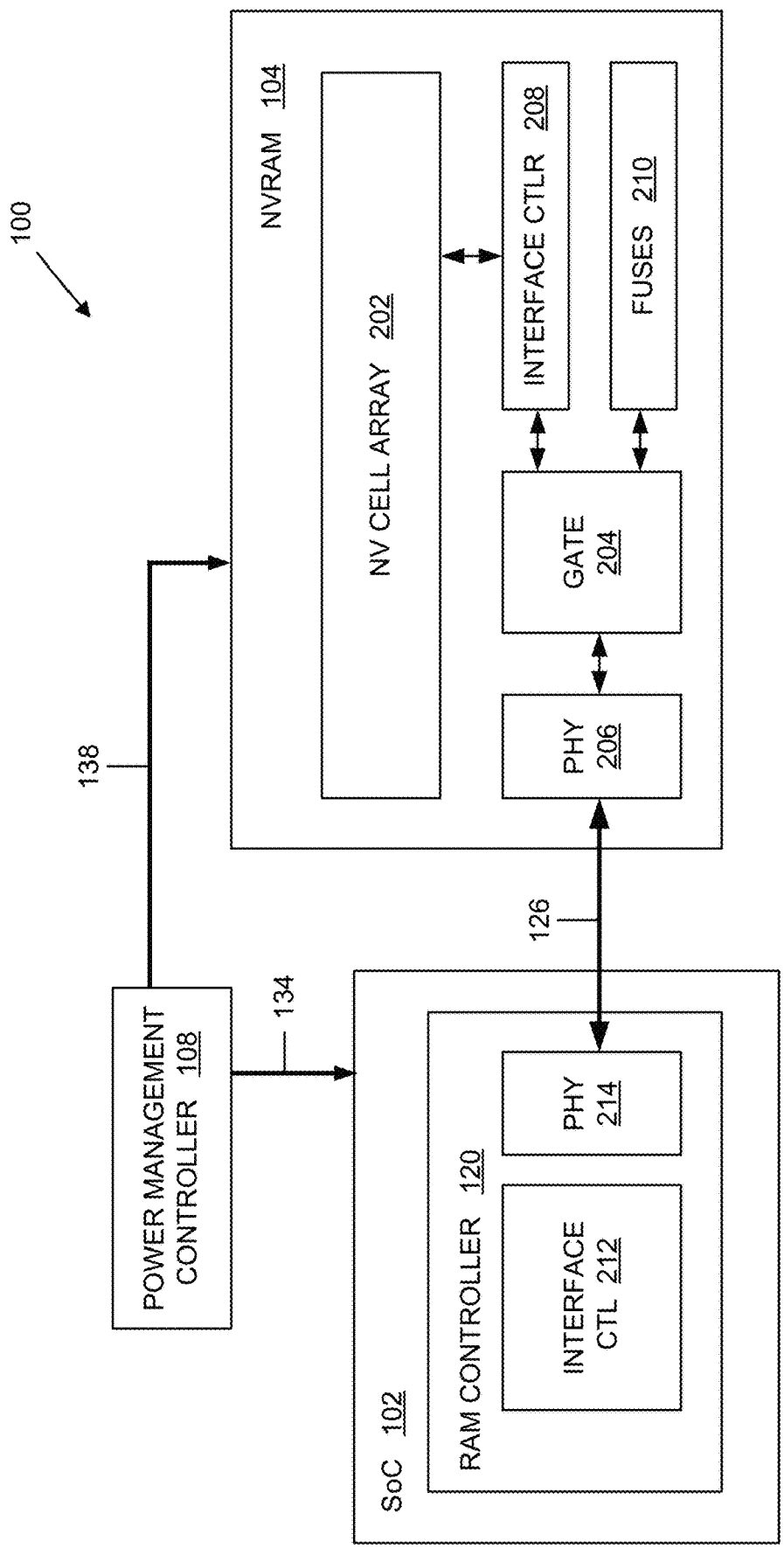
FIG. 2 is a block diagram illustrating an embodiment of the NVRAM in FIG. 1

As illustrated in FIGS. 1 & 2, the SoC 102 comprises fuse(s) 132 that are securely paired with fuse(s) 210 residing in NVRAM 104. The SoC fuse(s) 132 and the NVRAM fuse(s) 210 are provisioned with authentication data, values, passwords, private/public keys associated with encryption/decryption algorithm(s), etc. for implementing an authentication process or secure password exchange between the SoC 102 and NVRAM 104. When powered down and upon boot-up, the gate mechanism 204 in NVRAM 104 is configured in a "locked" state that prevents read/write operations from accessing NV cell array 202. When the system 100 is booted up, a trusted boot program 130 begins executing on the CPU 110. The trusted boot program may be initially stored on the SoC 102 in ROM 114 or it may be stored externally (e.g., retrieved from storage memory 106 or from peripherals such as USB 342 or network card 388). It should be appreciated that a secure and trusted boot program that is authenticated during the boot process may be allowed to perform the secure unlocking actions. The authenticity of the trusted boot program 130 may be determined (pass or fail) by an SoC on-chip authentication scheme, which is typically implemented using immutable hardware and read-only memory (ROM) within the SoC 102. These or other steps may confirm the authenticity of the program that unlocks the NVRAM 104 so that system security is not compromised by an intruder. Failure of authentication may stop the program from advancing, resulting in the NVRAM 104 remaining locked. Upon successful verification of its legitimacy, the trusted boot program 130 (or other secure software) may proceed with the unlock procedure by fetching secure password exchange data stored in fuse(s) 132 on SoC 102. Based on the raw security data stored in fuse(s) 132 (or data calculated therefrom using private and/or public keys, encryption algorithm(s), etc.), an unlock password may be provided to RAM controller 120 and sent to NVRAM 104 via bus 126.

As illustrated in FIG. 2, RAM controller 120 comprises an interface controller 212 and a physical layer 214. Interface controller 212 reformats the data to/from clients of SoC 102 (e.g., CPU 110, a GPU, a DSP, etc.) into a packet and/or bus protocol compatible with the NVRAM device 104. Reformatting may include the data segmentation/reassembly, physical address realignment, link error handling, and the generation of control and address signals that may be driven/received by the physical layer 214 via the bus 126. Physical layer 214 provides the SoC's external electrical interface and physical connections of high-speed bus 126 to a corresponding physical layer 206 in NVRAM 104. Physical layer 206 in NVRAM 104 is electrically coupled to the gate mechanism 204. In response to receiving the unlock password from the SoC 102, the NVRAM 104 compares the received unlock password to a pass gate value provisioned in fuse(s) 210. Fuse(s) 210 may leverage existing fuse functionality in NVRAM devices. For example, fuse(s) 210 may be implemented using the fuse functionality conventionally used in memory devices for the repair of failed row replacement (e.g., additional row(s) for storing pass gate value(s)). In an embodiment, the fuse(s) 210 may comprise a programmable memory cell. It should be appreciated, however, that the pass gate value may be hardcoded in NVRAM 104. In an embodiment, the pass gate value may be hardcoded into a memory device using, for example, logic circuit(s), state machines, a read only memory, metal traces, etc. If the unlock password received from the SoC 102 matches the pass gate value, the gate mechanism 204 may be changed from the "locked state" (in which read/write operations are disabled) to an "unlocked state" in which the SoC 102 is able to perform read/write operations to the NV cell array 202. If the unlock password received from the SoC 102 does not match the pass gate value, the gate mechanism 204 may be maintained in the "locked state" with read/write operations disabled. If repeated unlock attempts fail, the gate mechanism 204 may permanently disable the NVRAM 104 when a self-destruct counter exceeds a threshold.

Figure 3:
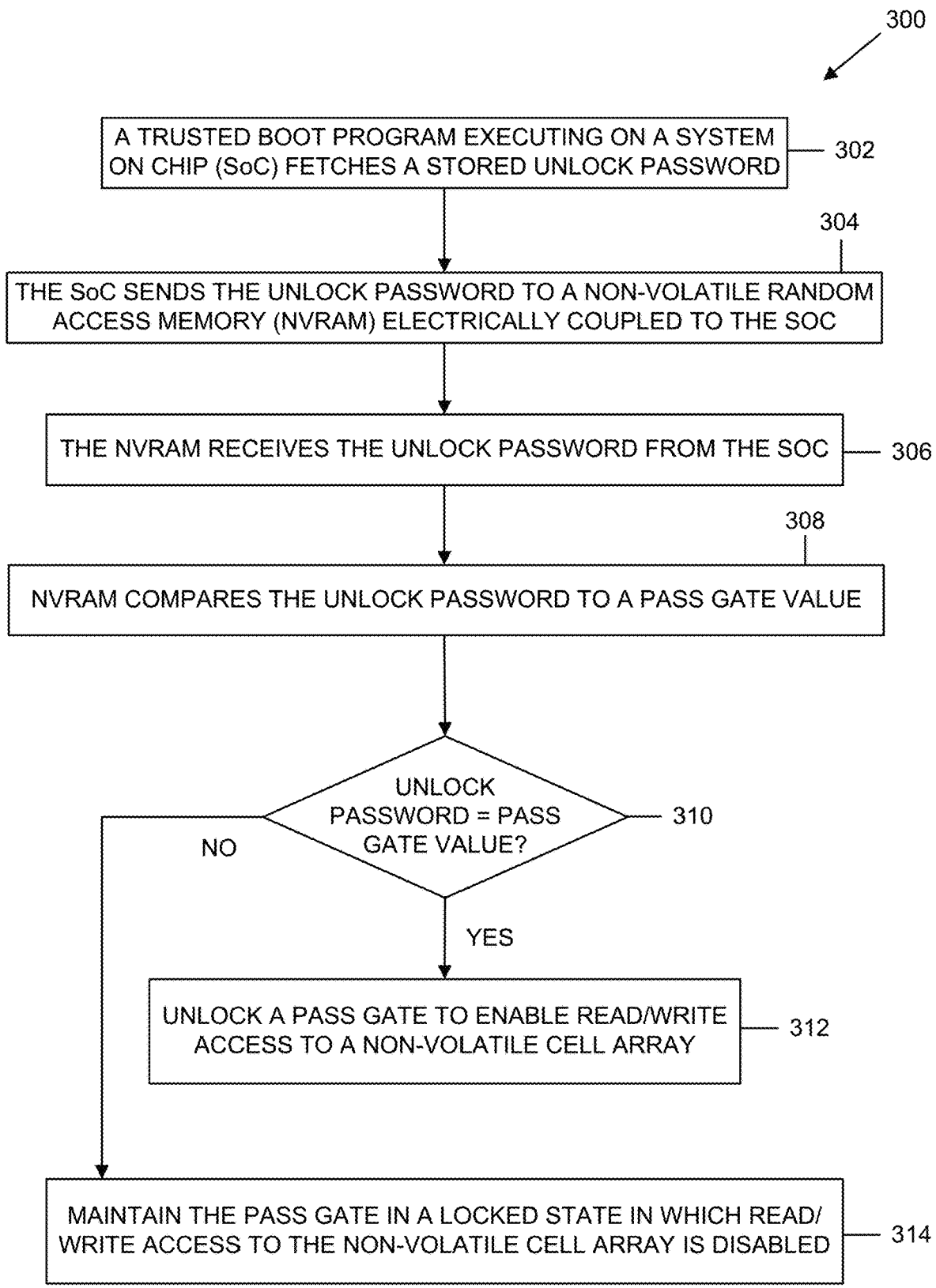
FIG. 3 is a flowchart illustrating an embodiment of a method for providing secure access to the NVRAM in FIGS. 1 and 2.

FIG. 3 illustrates an embodiment of a method 300 for providing secure access to NVRAM 104 via the gate mechanism 204, the SoC fuse(s) 210, and the NVRAM fuse(s) 132. At block 302, the system 100 is booted up and the trusted boot program 130 begins executing on the CPU 102. The trusted boot program 130 initiates a fetch of the unlock password stored in fuse(s) 210 on the SoC 102. At block 304, the unlock password is sent to NVRAM 104 by RAM controller 120 via bus 126. In an embodiment, the unlock password may be sent either unencrypted or encrypted. Encryption may be performed within the SoC 102. It may be encrypted programmatically by software running on the CPU 110, or it may be encrypted in dedicated encryption hardware (not shown). At block 306, NVRAM 104 receives the unlock password at physical layer 206. If the unlock password was encrypted by the SoC 102, it must first be decrypted by the hardware gate logic 404. At block 308, NVRAM compares the unencrypted unlock password to a pass gate value stored in fuse(s) 210. At decision block 310, the pass gate mechanism 204 is unlocked if the unlock password matches the pass gate value. If the unlock password does not match the pass gate value, the pass gate mechanism 204 may be maintained in the locked state to prevent read/write access to the NV cell array 202.

Figure 4:
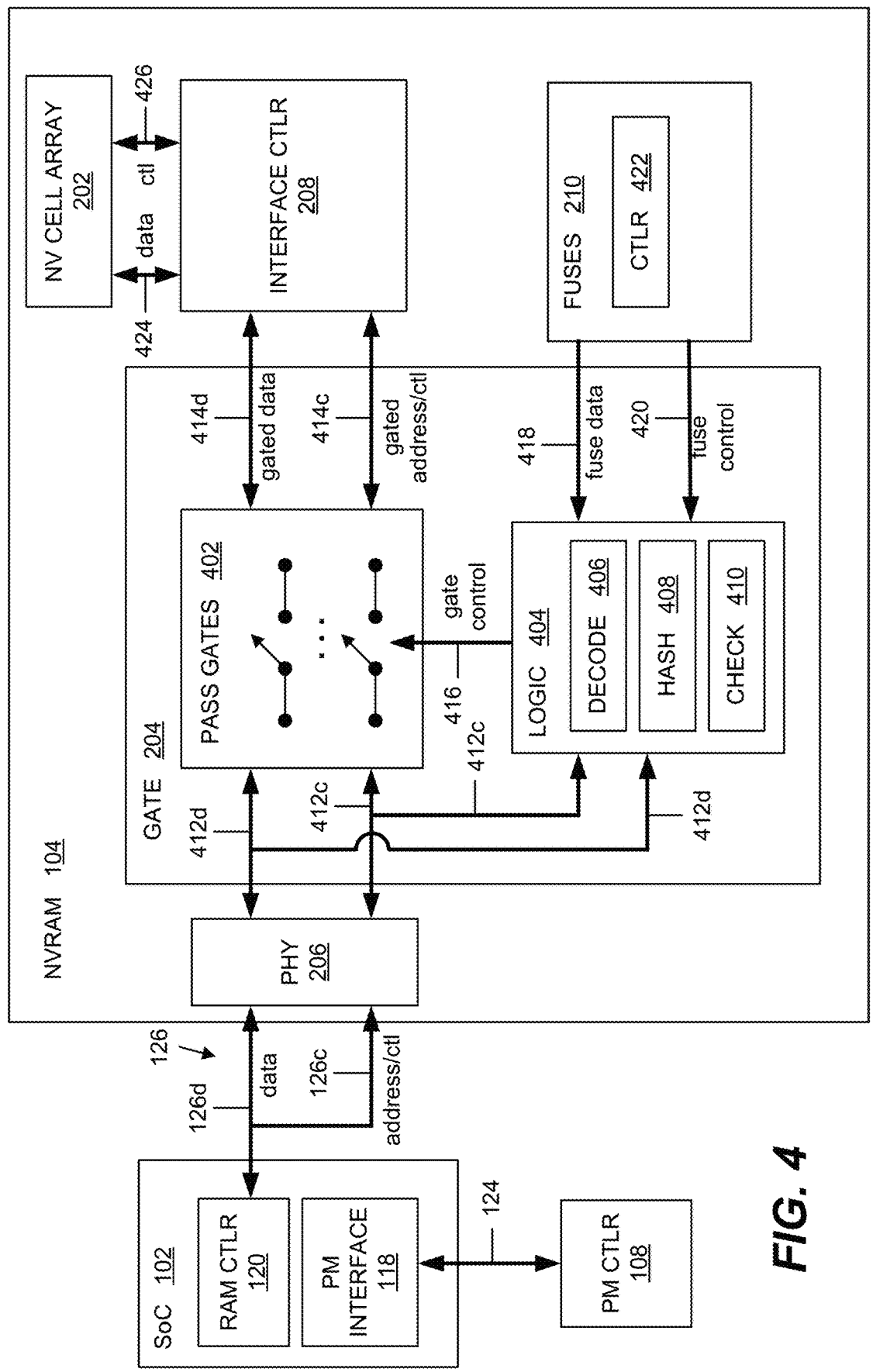
FIG. 4 is a block diagram illustrating an exemplary implementation of the pass gate in the NVRAM of FIGS. 1 and 2.

It should be appreciated that the gate mechanism 204 in NVRAM 104 may be implemented in various ways to accommodate, for example, cost, complexity, performance, level of security, etc. FIG. 4 illustrates a circuit diagram of an exemplary implementation of a gate mechanism 204 configured to provide a cost-effective, mass-producible NVRAM device. In this embodiment, the gate mechanism 204 comprises one or more pass gates 402 and control logic 404. One of ordinary skill in the art will appreciate the design advantages of implementing the gate mechanism 204 with relatively uncomplicated circuits and logic with minimal memory die area without the use of a more complicated microcontroller.

As illustrated in FIG. 4, the pass gates 402 may comprise one or more in-line switches that connect/disconnect the physical layer 206 to an interface controller 208 that provides access to NV cell array 202. As mentioned above, the physical layer 206 provides the connections associated with high-speed bus 126. Connections 126d correspond to data signals, and connections 126c correspond to address/control signals. The physical layer 206 provides the data signals associated with connections 126d to the pass gates 402 and the control logic 404 via connections 412d. The physical layer 206 provides the address/control signals associated with connections 126d to the pass gates 402 and the control logic 404 via connections 412c.

As further illustrated in FIG. 4, each pass gate 402 comprises a first contact and a second contact. The first contact is electrically coupled to the corresponding data connection(s) 412d and address/control connections 412c, and the second contact on the other side of the gate or switch is electrically coupled to corresponding gated data connection(s) 414d and gated address/control connections 414c. The control logic 404 is electrically coupled to each pass gate 402 via connection(s) 416 through which gate control signals may be provided to open and close the individual switches. In this regard, the "locked state" corresponds to the operational state in which the pass gates 402 are opened to prevent access to gated connections 414d and 414c.

Other embodiments of the pass gate 402 function may include a bidirectional transceiver with an output enable controlled by the gate control 416, a bidirectional transceiver that may be powered on/off via a power rail under the control of the gate control 416, or a bidirectional latch/register that may have either output enable or power rail under the control of the gate control 416. The circuits employed may be purposefully designed for bidirectional signaling, or may consist of two separate circuits for handling each (forward and reverse) direction corresponding to write and read data traffic.

As mentioned above, when the device is powered down, the control logic 404 may receive a corresponding command from the power manager controller 108 and, in response, send a "lock" gate control signal via connection(s) 416 to the pass gates 402. It should be appreciated that the gate control signals may comprise individual signals (e.g., one gate control wire for one pass gate) or a single signal (e.g., one gate control for all of the pass gates). In other embodiments, the pass gates 402 may be replaced by a power switch that powers-up or powers-down the interface controller 208 to NV cell array 202. In response to the "lock" gate control signal, the pass gates 402 are opened to prevent access to gated connections 414d and 414c. In this manner, when the device is booted, the gate mechanism 204 is in the "locked state" with the pass gates 402 in the open position to initially prevent read/write operations from accessing NV cell array 202.

When system 100 is booted up and the trusted boot program 130 begins executing on the CPU 102, the unlock password stored in fuse(s) 132 on the SoC 102 may be fetched and provided to physical layer 206, as described above. The control logic 404 fetches the pass gate value provisioned in fuse(s) 210 via, for example, a fuse data bus 418 and a fuse control bus 420. As illustrated in FIG. 4, the fuse(s) 210 may comprise a controller 422 to facilitate communication with the control logic 404. The control logic 404 compares the pass gate value to the unlock password received from the SoC 102. If the unlock password matches the pass gate value, the control logic 404 sends an "unlock" gate control signal to the pass gates 402 via connection(s) 416. In response to the "unlock" gate control signal, the pass gates 402 are closed, thereby connecting data connection(s) 412d and address/control connections 412c to gated connection(s) 414d and gated address/control connections 414c, respectively. In this "unlocked state", the gate mechanism 204 provides unrestricted access to NV cell array 210 via data bus 424 and control bus 426.

As mentioned above, the password exchange between the SoC 102 and the gated NVRAM 104 may be implemented in various ways. In one embodiment, a simple unencrypted password exchange may be implemented via fuse(s) 132 and 210. In other embodiments, the secure password exchange may employ any desirable encryption algorithm(s) to improve the level of security. As illustrated in FIG. 4, when the secure password exchange employs encryption, the control logic 404 may comprise logic modules to support a decode function (block 406), a hash function (block 408), and a check function (block 410).

Decode logic 406 receives control and address via bus 412c, and data via bus 412d. In an embodiment, a predetermined and/or standardized protocol may be implemented for controlling the gate logic block 404, exchanging information such as keys and passwords, or the initialization and programming of elements such as fuses 210. For example, there may be a specific command on the control and address bus 412d that is decoded in block 406 and can then initiate the specific command function. In other embodiments, there may be a unique command and data associated for each type of function (e.g., reset gate logic, program fuse data (multiple locations), program private key, program password, program self-destruct failed tries, enable tamper mechanism, input key modulus p, input key base g, retrieve hash, unlock unencrypted password, unlock encrypted password, etc.).

Decode logic 406 may be responsible for parsing and triggering the appropriate operations in response to the incoming control, address, and data. As further illustrated in FIG. 4, the control and address 412c and data 412d also arrive at pass gates 402 and, if unlocked, propagate to interface controller 208 where it will perform similar predetermined and/or standardized mission-mode operations such as NV cell array read, NV cell array write, NV cell array page select, NV cell array repair, NVRAM device configuration, PHY advanced configuration, and any other functionality that is unrelated to tamper-proofing functions.

A hash function 408 performs modulo arithmetic operations for a secret key exchanging procedure and may include lookup tables and also modulo addition sequential and parallel computation logic. A check function 410 comprises the control logic for comparing the password sent from the SoC 102 against a local copy previously programmed into local NVRAM fuses 210. Decryption logic (not shown) may be included within check function 410 because the SoC 102 may choose to send the password using encryption to prevent a snooper from viewing the password as it travels via external bus 126. If the SoC 102 has encrypted the password, then the decryption logic will first decrypt the password using a shared secret key derived during a secure exchange process such as the Diffie-Hellman method.

FIG. 5 illustrates an exemplary embodiment for unlocking gate mechanism 204 using a Diffie-Hillman password exchange between the SoC 102 and NVRAM 104. Each row in table 500 represents a corresponding step in the password exchange method. The operation of each step is listed in column 530. Column 532 lists information that is "known" by the SoC 102. Column 534 lists information that is "not known" by the SoC 102. Column 536 lists information that is "known" by NVRAM 104. Column 538 lists information that is "not known" by NVRAM 104. Column 540 lists information that may be susceptible to capture by a malicious "snooper". Column 542 lists information that is not susceptible to capture by the malicious "snooper", exemplifying the security provided via the Diffie-Hillman password exchange.

At steps 502 and 504, the SoC 102 sends changeable public keys "g" and "p" over NVRAM bus 126. At step 506, the SoC 102 and NVRAM 104 retrieve a fixed private key, which may be programmed into the fuses 132 and 210, respectively. At steps 508, 510, and 512, the private and public keys locally generate a hash, which is exchanged. The SoC 102 transmits its hash "A" to NVRAM 104 and also reads back the NVRAM's hash "B". At steps 514 and 516, using the hash, public keys, and their respective private key, the SoC 102 and NVRAM 104 separately compute the secret shared key. Without having any access to "a" or "b", the snooper cannot compute "s". At step 518, using this secret key "s", the SoC 102 encrypts and sends a password that was previously stored in NVRAM fuses 210. At steps 520 and 522, NVRAM 104 receives the password message, decrypts it with the secret key "s", and if it matches the previously stored password then gate mechanism 204 is opened, in the manner described above.

As mentioned above, the gate mechanism 204 in NVRAM 104 may be configured in various alternative ways to accommodate, for example, cost, complexity, performance, level of security, etc. In one embodiment, the gate mechanism 204 may be configured, as follows, to provide a cost-effective design while providing a practically reasonable level of security protection. The control logic 402 may include a self-destruct counter configured to permanently lock the gate mechanism 204 after a predetermined number of unsuccessful password exchanges. It should be appreciated that the self-destruct counter provides an additional level of security to against brute-force attacks. The fuse(s) 132 and 210 may be simplified in structure and complexity to allow a limited number of permissible values for the public and private key. In this regard, the hash function described above (block 408) may be implemented in a straightforward manner using, for example, a lookup table, linear feedback shift register, or parallel logic. In embodiments with limited public/private key values, a brute force attacker may obtain secret shared keys and attempt the password unlock. However, without knowledge of the password, the chance of a brute force attacker gaining access before the self-destruct counter mechanism permanently disables the device would be extremely low. Furthermore, the password value may be sufficiently long (e.g., any 256-bit value) while using a relatively uncomplicated encryption/decryption implementation (e.g., a stream cipher, a linear feedback shift register, block cipher, other modulo/Xor logic, etc.). One of ordinary skill in the art will appreciate that, by keeping each security feature relatively low in complexity, NVRAM 104 may be implemented in cost-effective design with a reasonable level of tamper/snoop resistance. It should be appreciated that, in a simplified configuration, the systems and methods illustrated in FIGS. 3, 4, and 5 may be implemented with a reduced level of complexity and secure protection, for example, by non-programmable hardcoding the password in the NVRAM 104 with the SoC 102 sending the hardcoded password without using encryption.

Figure 6:
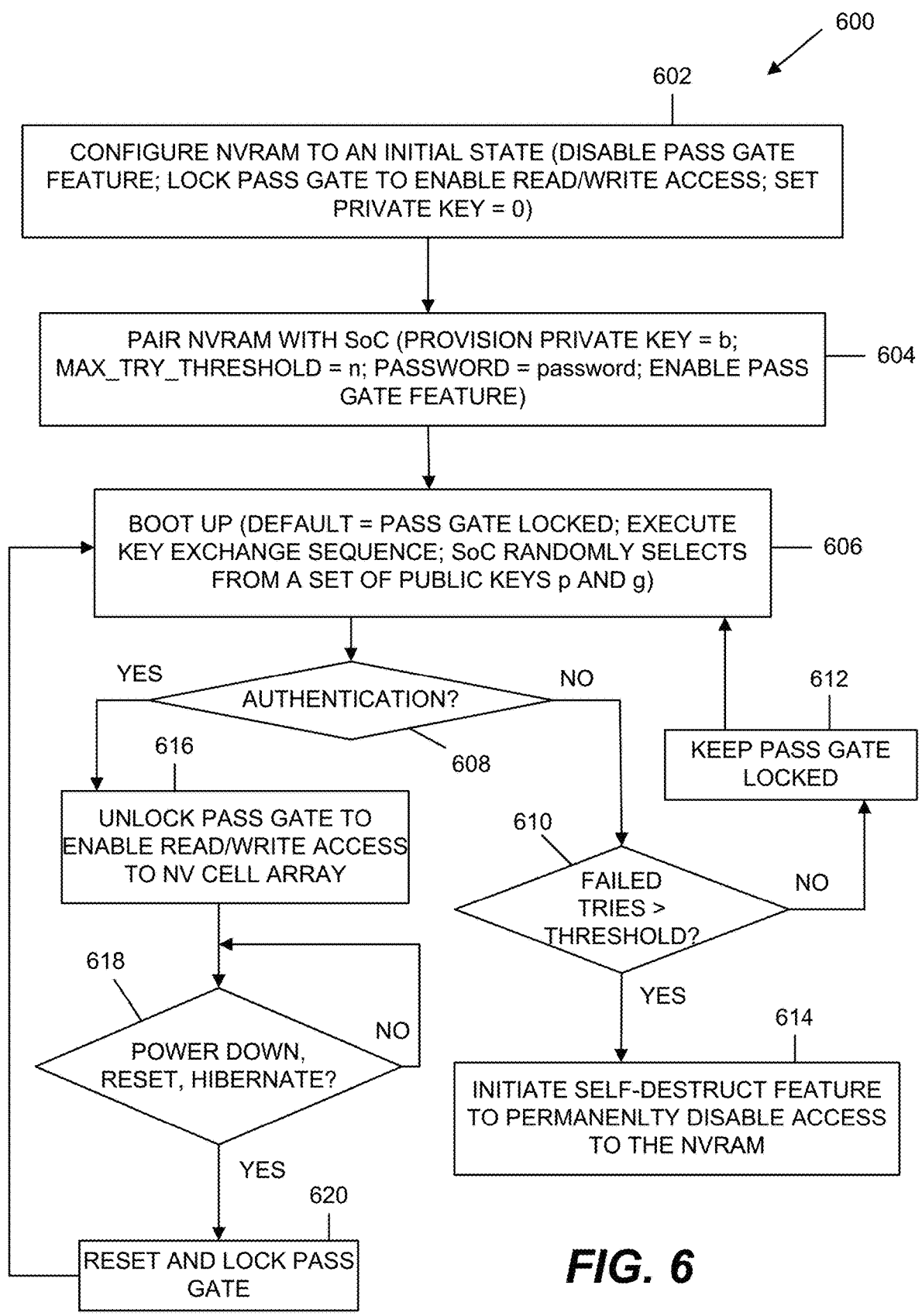
FIG. 6 is a flowchart illustrating an embodiment of a method for initializing the SoC and the NVRAM of FIGS. 1, 2, and 4.

FIG. 6 is a flowchart illustrating an embodiment of a method 600 for initializing a computing device manufactured to incorporate the SoC 102 and the NVRAM 104. At block 602, NVRAM 104 may be configured to an initial state in which the pass gate feature is initially disabled by unlocking the gate mechanism 204 and setting a private=0. At block 604, the NVRAM 104 may be paired with the SoC 102 by provisioning a private key=b, setting the self-destruct counter threshold (MAX_TRY_THRESHOLD)=n, a password="password", and enabling the pass gate feature. At block 606, upon device boot-up, the device is in a default state with the gate mechanism 204 locked. A key exchange sequence may be executed, and the SoC 102 may randomly select from a set of public keys p and g. At decision block 608, NVRAM 104 initiates password authentication. If the password is authenticated, at block 616, the gate mechanism 204 is unlocked to enable read/write access to NV cell array 202. When the device is initiated to be powered down, reset, or enter a hibernate mode (block 618), the gate mechanism 204 is locked (block 620), with process flow returning to block 606. If however, the password is not authenticated (decision block 608), the method 600 may determine (decision block 610) whether the self-destruct failed tries counter has exceeded a threshold (MAX_TRY_THRESHOLD). If the threshold is exceeded, a self-destruct feature many be initiated to permanently disable NVRAM 104. If the threshold is not exceeded, the gate mechanism 204 may be maintained in the "locked state", with process flow returning to block 606 and the failed tries counter being incremented. At block 616 on a successful unlocking, the failed tries counter may be reset. It should also be appreciated that, at block 604, the NVRAM 104 may be paired with the SoC 102 without enabling the pass gate feature. In this manner, the NVRAM 1064 may be used in a legacy mode with an SoC that is not configured to support tamper proof operations. For example, in an embodiment, the SoC 102 may not include fuses 132, or the SoC 102 may not support additional commands to communicate with and control the NVRAM gate logic 404.

Figure 7:
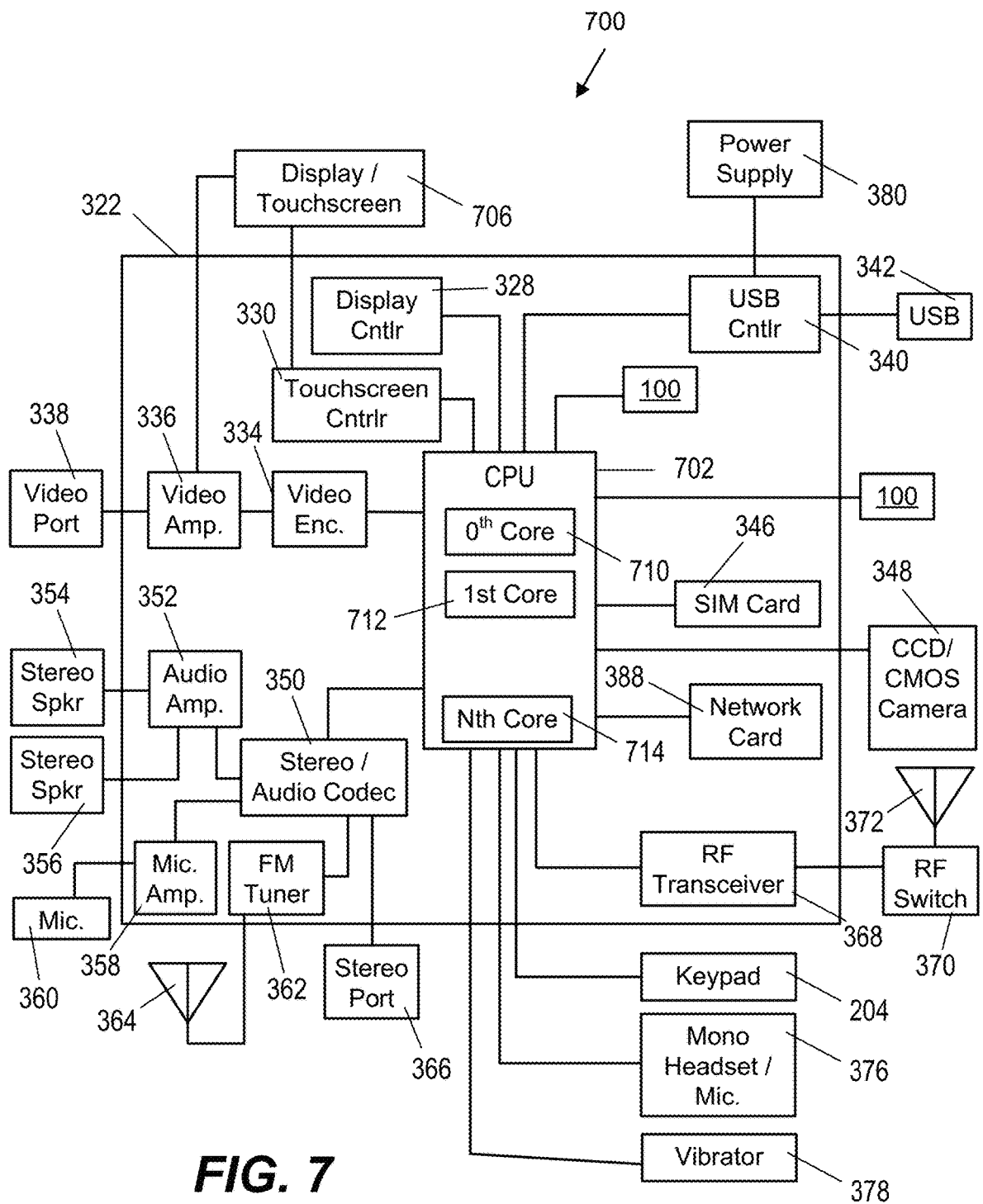
FIG. 7 is a block diagram of an embodiment of a portable computing device for incorporating the system of FIGS. 1, 2, and 4.

As mentioned above, the system 100 may be incorporated into any desirable computing system. FIG. 7 illustrates the system 100 incorporated in an exemplary portable computing device (PCD) 700. It will be readily appreciated that certain components of the system 100 may be included on the SoC 322 (e.g., fuse(s) 132, RAM controller 120, trusted boot program 130) while other components (e.g., NVRAM 104) may be external components coupled to the SoC 322. The SoC 322 may include a multicore CPU 702. The multicore CPU 702 may include a zeroth core 710, a first core 712, and an Nth core 714. One of the cores may comprise, for example, a graphics processing unit (GPU) with one or more of the others comprising the CPU.

A display controller 328 and a touch screen controller 330 may be coupled to the CPU 702. In turn, the touch screen display 706 external to the on-chip system 322 may be coupled to the display controller 328 and the touch screen controller 330.

FIG. 7 further shows that a video encoder 334, e.g., a phase alternating line (PAL) encoder, a sequential color a memoire (SECAM) encoder, or a national television system (s) committee (NTSC) encoder, is coupled to the multicore CPU 702. Further, a video amplifier 336 is coupled to the video encoder 334 and the touch screen display 706. Also, a video port 338 is coupled to the video amplifier 336. As shown in FIG. 7, a universal serial bus (USB) controller 340 is coupled to the multicore CPU 702. Also, a USB port 342 is coupled to the USB controller 340.

Further, as shown in FIG. 7, a digital camera 348 may be coupled to the multicore CPU 702. In an exemplary aspect, the digital camera 348 is a charge-coupled device (CCD) camera or a complementary metal-oxide semiconductor (CMOS) camera.

As further illustrated in FIG. 7, a stereo audio coder-decoder (CODEC) 350 may be coupled to the multicore CPU 702. Moreover, an audio amplifier 352 may coupled to the stereo audio CODEC 350. In an exemplary aspect, a first stereo speaker 354 and a second stereo speaker 356 are coupled to the audio amplifier 352. FIG. 7 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 7 further illustrates that a radio frequency (RF) transceiver 368 may be coupled to the multicore CPU 702. An RF switch 370 may be coupled to the RF transceiver 368 and an RF antenna 372. A keypad 204 may be coupled to the multicore CPU 702. Also, a mono headset with a microphone 376 may be coupled to the multicore CPU 702. Further, a vibrator device 378 may be coupled to the multicore CPU 702.

FIG. 7 also shows that a power supply 380 may be coupled to the on-chip system 322. In a particular aspect, the power supply 380 is a direct current (DC) power supply that provides power to the various components of the PCD 600 that require power. Further, in a particular aspect, the power supply is a rechargeable DC battery or a DC power supply that is derived from an alternating current (AC) to DC transformer that is connected to an AC power source.

FIG. 7 further indicates that the PCD 700 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, a television/cable/satellite tuner, or any other network card well known in the art. Further, the network card 388 may be incorporated into a chip, i.e., the network card 388 may be a full solution in a chip, and may not be a separate network card 388.

As depicted in FIG. 7, the touch screen display 606, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 may be external to the on-chip system 322.

Figure 8:
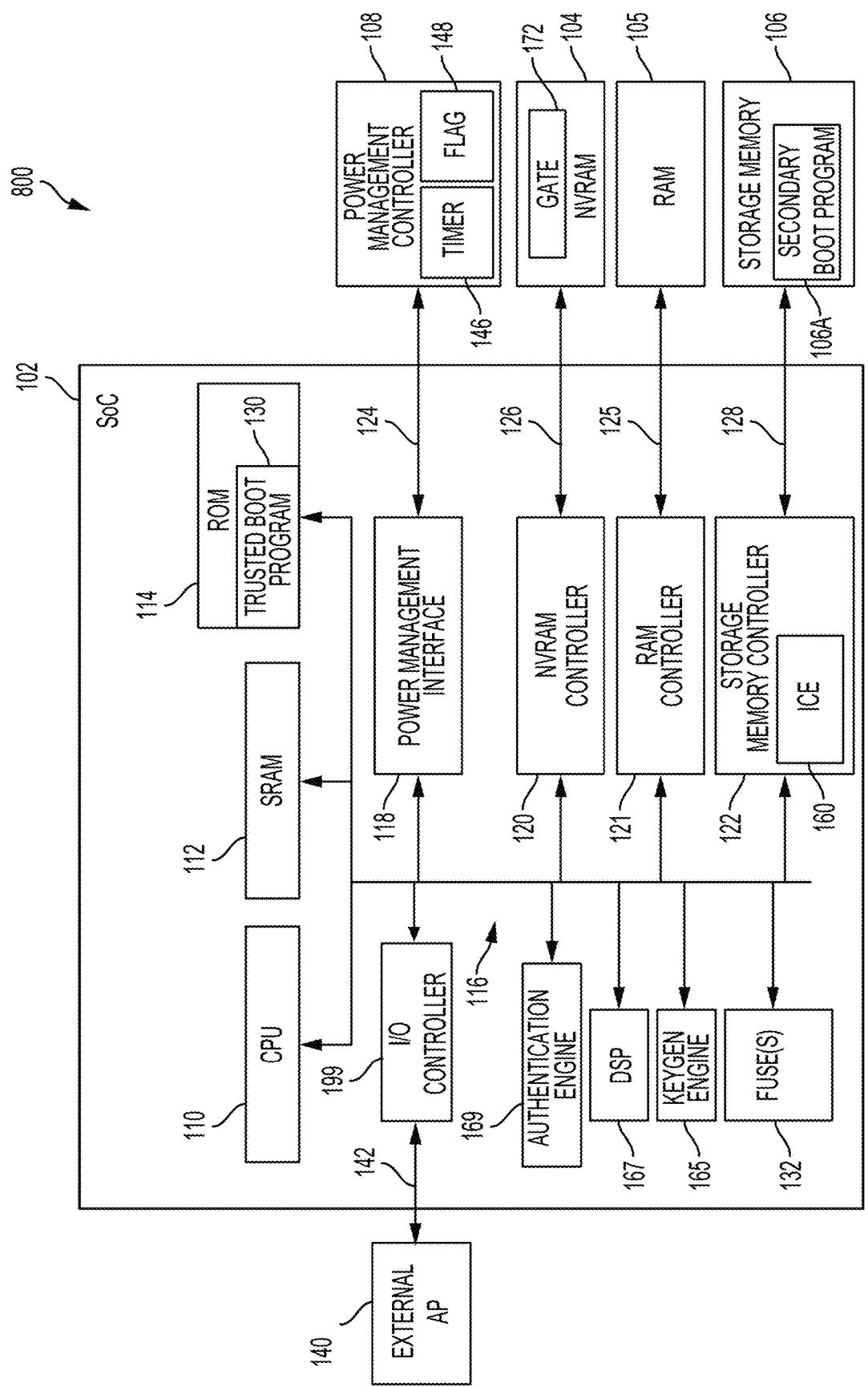
FIG. 8 illustrates a block diagram of a system operable to being booted in a "normal" mode or a "power saving" mode.

FIG. 8 illustrates a block diagram of a system 800 operable to being booted in a "normal" mode or a "power saving" mode. An SoC 102 contains a number of subsystems and logical blocks that enable functionality within a portable computing device. A central processing unit ("CPU") 110 may be electronically coupled to various components within the SoC 102 via a bus 116. One of skill in the art will appreciate that the bus 116 could be a logical fabric, a physical fabric, a network on chip ("NoC"), or any number of equivalent communication channels. A static random access memory ("SRAM") 112 may be electronically coupled via the bus 116 to the various components within the SoC 102. SRAM 112 is a type of semiconductor memory that uses bistable latching circuitry and is typically used for CPU-related caching operations. A read-only memory ("ROM") 114 may be electronically coupled via the bus 116 to the various components within the SoC 102. The ROM 114 may contain data accessible by the CPU 110, including boot-related code and/or instructions. In one aspect, a trusted boot program 130 may reside within the ROM 114. The trusted boot program 130 may be utilized by the SoC 102 during boot operations to power up the portable computing device containing the SoC 102. When the portable computing device is in a power-off state, a "cold" boot may be required. During such a "cold" boot, a volatile memory (e.g., RAM 105) may be unknown and contain unreliable data; therefore, the trusted boot program 130 may be stored in ROM 114, in which the trusted boot program 130 may be stored in a substantially unalterable state. A secondary boot program 106a stored in storage memory 106 may first be authenticated by the trusted boot program 130 prior to operation. There may be multiple secondary untrusted boot programs (not shown). These secondary untrusted boot programs may be copied from storage memory 106 into SRAM 112, RAM 105, or NVRAM 104 to enable programmatic execution after successful authentication and/or decryption. Secondary untrusted boot programs may be authenticated and executed sequentially, concurrently, or combination thereof during the overall boot process. Decryption may invoke the Inline Cryptography Engine ("ICE") 160. During sleep, volatile memory is known and remains trusted thus requiring substantially fewer operations than a "cold" boot.

An authentication engine 169 may be electronically coupled via the bus 116 to provide verification of data and/or instructions relating to boot operations of the portable computing device. In one aspect, the authentication engine 169 may assist the trusted boot program 130 stored in ROM 114 with the authentication of secondary untrusted additional boot programs 106A. In another aspect, in a series of sequential boot programs, the authentication engine 169 may assist a first secondary boot program 106A with the authentication of a second secondary untrusted boot program (not shown). In another aspect, the authentication engine 169 may be used to unlock a gate mechanism 172 and provide access to an NVRAM 104 via a secured channel.

A digital signal processor ("DSP") 167 may be electronically coupled via bus 116 to the various components within the SoC 102. The DSP 167 may be used to measure, to filter, and/or to compress continuous real-world analog signals. Many of the algorithms configured within the DSP 167 may be operable to being executed on the CPU 110. However, the DSP 167 may have better power efficiency and higher performance for certain operations, as one of skill in the art will appreciate. As such, one of skill in the art may allocate a first set of operations to the CPU 110 and a second set of operations to the DSP 167 such that the advantages of both processing units can be utilized. One of skill in the art may appreciate that the first set of operations and the second set of operations may be coextensive and/or related.

A keygen engine 165 may be electronically coupled to various components within the SoC 102 via the bus 116. In one aspect, the keygen engine 165 may be configured to secure and unsecure data controlled by an inline cryptography engine ("ICE") 160. In one aspect, the keygen engine 165 may be a hardware block that has additional security measures to prevent hacking, tampering, snooping, etc. The ICE 160 may be utilized, in one aspect, to encrypt or decrypt software images including the secondary boot programs 106A stored within the SoC 102. In one aspect, the ICE 160 may be implemented in a separate hardware block and not stored in a storage medium.

Fuses 132 may be electronically coupled via the bus 116 to the various components within the SoC 102. The fuses 132 may be programmable read-only memory ("PROM"), field programmable read-only memory ("FPROM"), one-time programmable non-volatile memory ("OTP NVM"), etc. In one aspect, the keygen engine 165 may access data from the ROM 114 and/or the fuses 132 in order to complete operations by the ICE 160.

A power management interface 118 may be connected via a bus 124 to a power management controller 108. Likewise, the power management interface 118 may be electronically coupled via the bus 118 to the various components within the SoC 102. Inside the power management controller 108, a timer 146 may be utilized to track exceptions, assist with power control, and/or assist with boot operations. The power management controller 108 may have a flag 148 which may be utilized to indicate the desired power state of the SoC 102 when the SoC 102 boots. For example, the flag 148 may indicate a "normal" mode or a "power saving" mode.

An NVRAM controller 120 may be electronically coupled via a bus 126 to the NVRAM 104. Likewise, the NVRAM controller 120 may be electronically coupled via the bus 116 to the various components within the SoC 102. The NVRAM 104 may be used for operational storage of data and executable code while the SoC 102 is in operation or powered down. One of skill in the art will appreciate that NVRAM 104 may be spin-transfer torque magneto resistive random-access memory ("STT-MRAM"), resistive random access memory ("RE-RAM"), three-dimensional cross point ("3D-XPOINT"), etc. In one aspect, the NVRAM 104 may be secured by the gate mechanism 172 (or gate 204 in FIGS. 1, 2, and 4), which prevents unauthorized access to data and/or code stored within the NVRAM 104. One of skill in the art will appreciate the need for the gate mechanism 172 because NVRAM 104 is operable to store data even after the SoC 102 has been powered down. As such, the data contained within the NVRAM 104 may be of high value to the user and require additional security measures which may not be necessary with traditional forms of RAM as traditional forms tend to lose data quickly once powered down (i.e. the memory is volatile).

A RAM controller 121 may be electronically coupled via bus 125 to a RAM 105. Likewise, the RAM controller 121 may be electronically coupled via the bus 116 to the various components within the SoC 102. The RAM 105 may be used for operational storage of data and executable code while the SoC 102 is in operation.

A storage memory controller 122 may be electronically coupled via bus 128 to a storage memory 106. Likewise, the storage memory controller 122 may be electronically coupled via the bus 116 to the various components of the SoC 102. The storage memory 106 may be used for operational storage of data, non-operational storage of executable code while the SoC 102 is in operation or powered down. As previously introduced, the ICE 160 may reside within the storage memory controller 122. In one aspect, the ICE 160 may be a hardware-implemented piece of logic and have security measures in place to prevent tampering, hacking, snooping, etc.

An external applications processor ("AP") 140 may be electronically coupled to an I/O controller 199, within SoC 102, via a bus 142, allowing communication between AP 140 and SoC 102. Further, the AP 140 and SoC 102 may selectively share resources. Communication between the AP 140 and the SoC 102 may include bidirectional transmission of control signals, status messages, and/or other data. Shared resources between the SoC 102 and the AP 140 may include any internal state or functional feature, e.g. permanent read-only memory, volatile memory, non-volatile memory, processors, accelerators, engines, etc. In one aspect, the external AP 140 may be yet another SoC similar to SoC 102. In another aspect, the external AP 140 may be a processor configured for a host of specialized tasks that supplement the functionality of SoC 102. One of skill in the art will appreciate that modern portable computing devices have a myriad of SoCs, processors, memories, etc. External AP 140 is merely shown to emphasize that yet another SoC and/or processor may need to interact with SoC 102 to achieve a desired functionality of the portable computing device (e.g., communicating over cellular networks, capturing video/images, playing three-dimensional games, etc.). For example, external AP 140 may be a graphics processing unit ("GPU") configured to provide graphical processing assistance to the SoC 102. In another example, the external AP 140 may be a cellular communication SoC configured to enable wireless communication of the portable communication device via the SoC 102.

Figure 9:
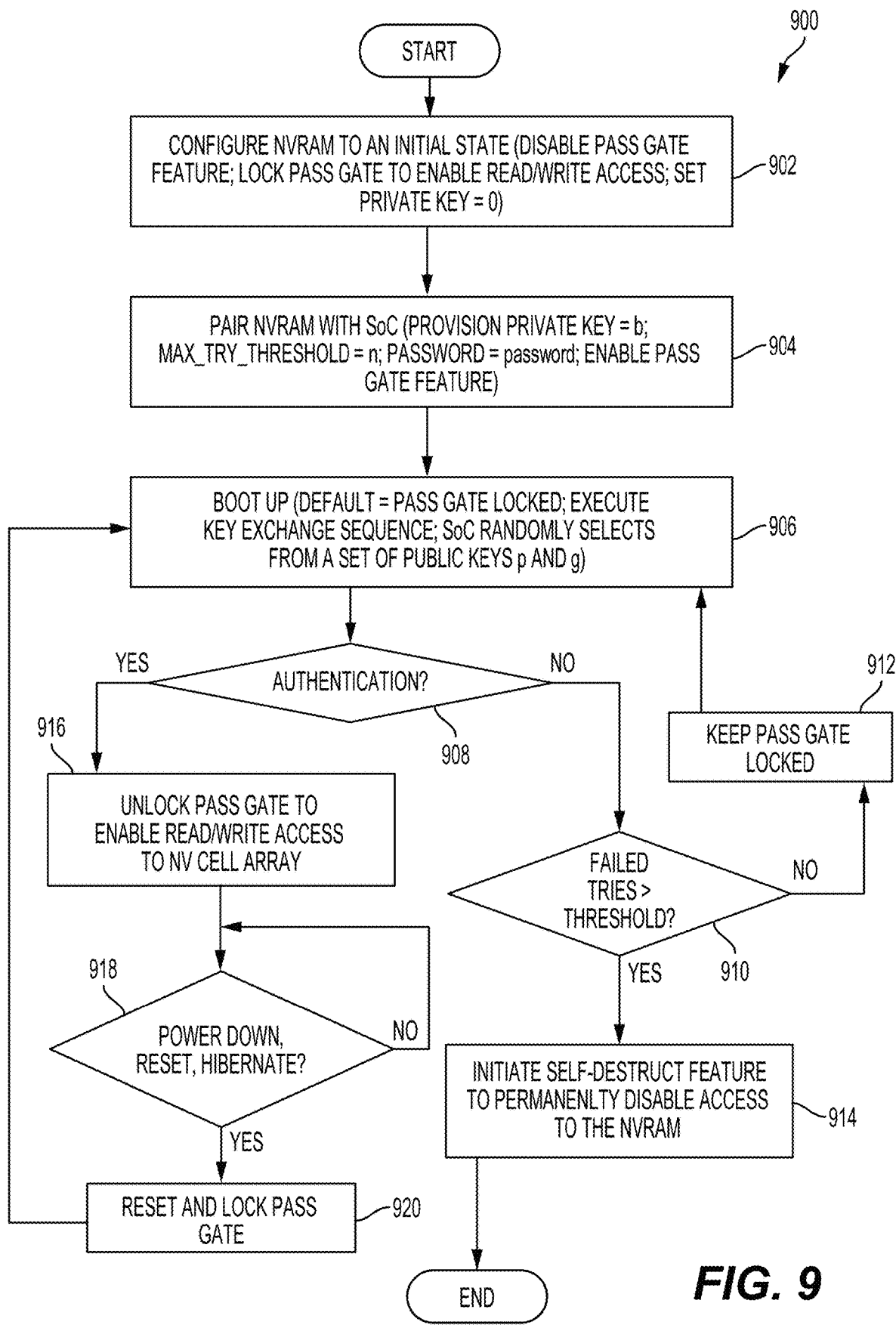
FIG. 9 is a flowchart illustrating a process for initializing a computing device manufactured to incorporate an SoC and NVRAM.

FIG. 9 is a flowchart illustrating an aspect of a process 900 for initializing a portable computing device manufactured to incorporate the SoC 102 and the NVRAM 104. The process 900 begins at the START block and proceeds to the block 902. At block 902, NVRAM 104 may be configured to an initial state in which the pass gate feature is initially disabled by unlocking the gate mechanism 172 and setting a private key=0. At block 904, the NVRAM 104 may be paired with the SoC 102 by provisioning a private key=b, setting the self-destruct counter threshold (MAX_TRY_THRESHOLD)=n, a password="password", and enabling the pass gate feature. At block 906, upon device boot-up, the device is in a default state with the gate mechanism 172 locked. A key exchange sequence may be executed, and the SoC 102 may randomly select from a set of public keys p and g. At decision block 908, the NVRAM 104 initiates password authentication. If the password is authenticated, at block 916, the gate mechanism 172 is unlocked to enable read/write access to the NVRAM 104. When the device is initiated to be powered down, reset, or enter a hibernate mode (block 918), the gate mechanism 172 is locked (block 920), with process flow returning to block 906. If, however, the password is not authenticated (decision block 908), the process 900 may determine, at decision block 910, whether the self-destruct failed tries counter has exceeded a threshold (MAX_TRY_THRESHOLD). At block 914, a self-destruct feature may be initiated to permanently disable the NVRAM 104 at which point the process 900 proceeds to the END block and terminates.

If the threshold is not exceeded, the gate mechanism 172 may be maintained in the "locked state," with process 900 returning to block 906 via block 912 where the failed tries counter is adjusted. At block 916 on a successful unlocking, the failed tries counter may be reset. It should also be appreciated that, at block 904, the NVRAM 104 may be paired with the SoC 102 without enabling the pass gate feature. In this manner, the NVRAM 104 may be used in a "legacy" mode with an SoC that is not configured to support tamper-proof operations. For example, in an aspect, the SoC 102 may not include fuses 132; alternatively, the SoC 102 may not support additional commands to communicate with and control the gate mechanism 172.

Figure 10:
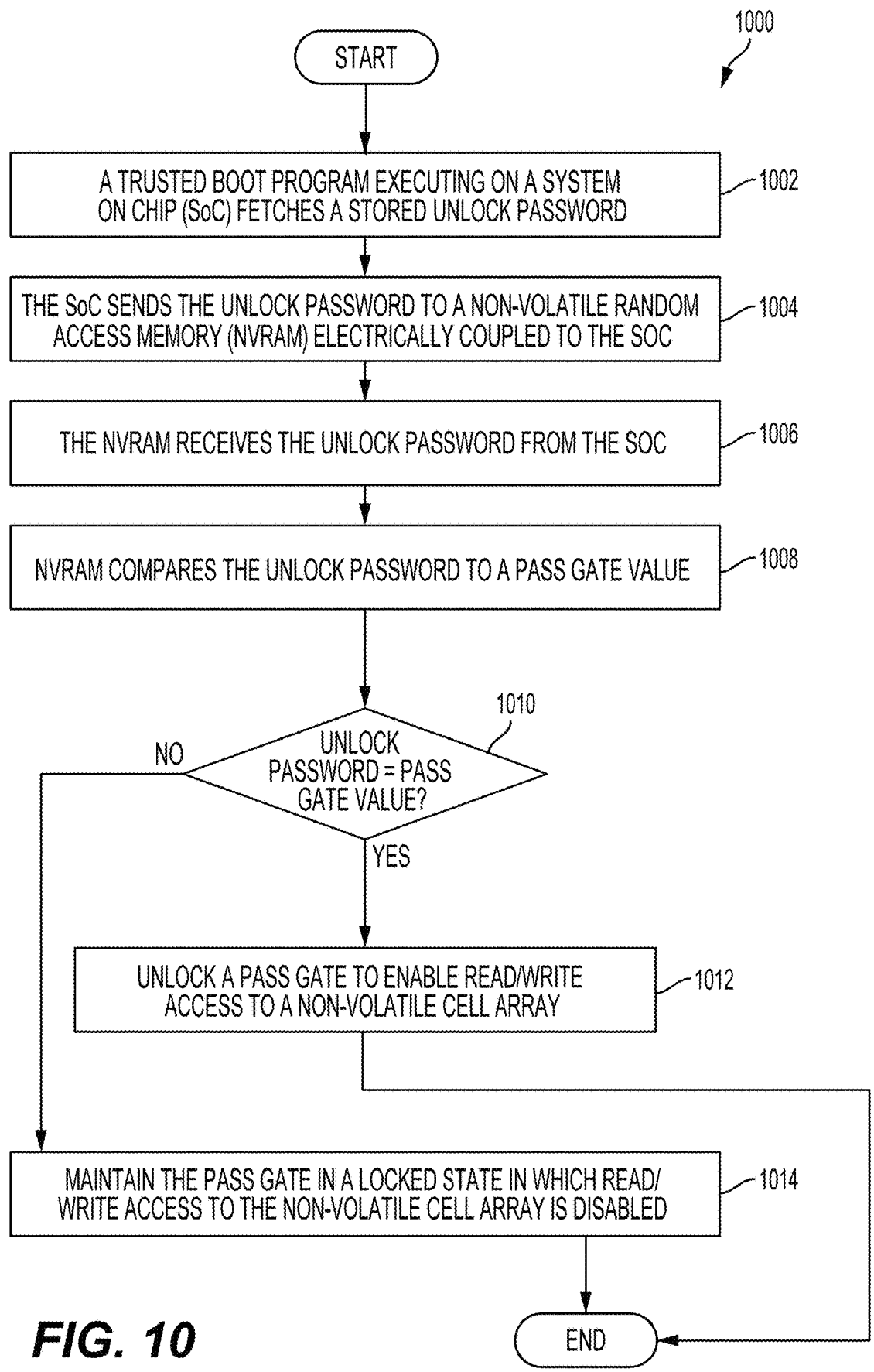
FIG. 10 is a flowchart illustrating a process for providing secure access to NVRAM.

FIG. 10 illustrates a process 1000 for providing secure access to NVRAM 104 via the gate mechanism 172, the fuses 132, and the NVRAM fuse(s) (not shown). The process 1000 begins at the START block and proceeds to the block 1002. At block 1002, the system 100 may be booted up, and the trusted boot program 130 may begin executing on the CPU 102. The trusted boot program 130 may initialize a fetch of the unlock password stored in fuse(s) 132 on the SoC 102. At block 1004, the unlock password may be sent to the NVRAM 104 by RAM controller 120 via bus 126. In an aspect, the unlock password may be sent either unencrypted or encrypted. In one aspect, encryption may be performed within the SoC 102. In another aspect, the unlock password may be encrypted programmatically by software running on the CPU 110. At block 1006, the NVRAM 104 receives the unlock password. At block 1008, the NVRAM compares the unencrypted unlock password to a value stored in fuse(s) 132. At decision block 1010, the gate mechanism 172 may be unlocked if the unlock password matches the value in the fuse(s) 132 at which point the process 1000 proceeds to the block 1012 where the NVRAM 104 is unlocked. After the functions in the block 1012 have completed, the process 1000 proceeds to the END block and terminates.

Returning to the decision block 1010, the process 1000 may determine the password does not match the value in the fuse(s) 132. If the unlock password does not match the value, the gate mechanism 172 may be maintained in the locked state to prevent read/write access to the NVRAM 104; process 1000 may then proceed to the END block and subsequently terminate.

It should be appreciated that the gate mechanism 172 in the NVRAM 104 may be implemented in various ways to accommodate any of: cost, complexity, performance, level of security, etc. One of ordinary skill in the art will appreciate the design advantages of implementing the gate mechanism 172 with relatively uncomplicated circuits and logic using minimal memory die area without the use of a more complicated microcontroller. However, one of skill in the art may arrive at complex implementations that achieve the same functionality described herein.

Figure 11:
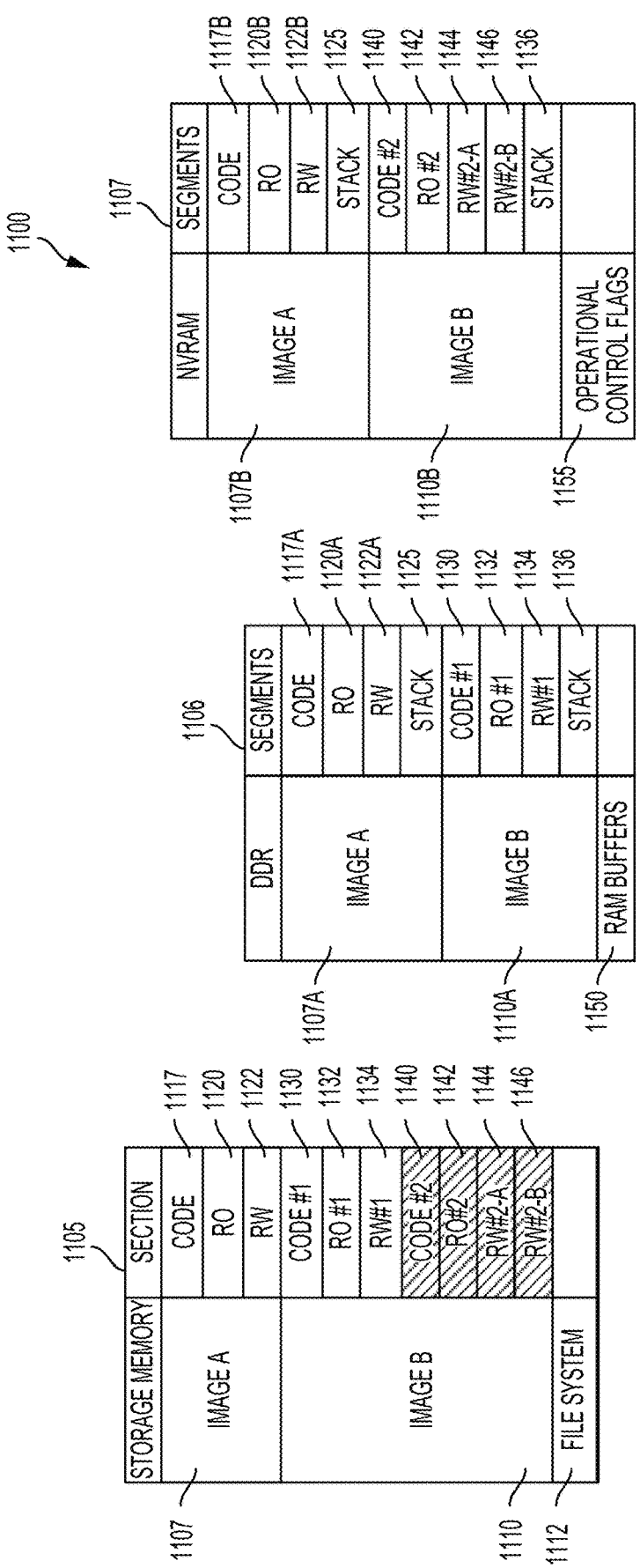
FIG. 11a is a block diagram depicting a logical relationship of storage memory data.
FIG. 11b is a block diagram depicting the logical relationship of RAM data.
FIG. 11c is a block diagram depicting the logical relationship of NVRAM data.

FIG. 11A is a block diagram depicting a logical relationship of storage memory data 1105. Storage memory 1105 may contain non-volatile images of programs which will be loaded into and run on the RAM 105 and or the NVRAM 104. The storage memory data 1105 comprises an image A 1107. Image A 1107 may be associated with the DSP 167. In one aspect, the image A 1107 may comprise a code portion 1117, a read-only ("RO") portion 1120, and a read-write ("RW") portion 1122. The code portion 1117 may be configured to carry out the operations of the DSP 167. For example, the DSP 167 may be operable to manage low-power processing operations related to a specific functionality supported by the SoC 102 (e.g., analog-to-digital cellular communication). The RO portion 1120 may contain constants, default values, lookup tables, and/or additional static data upon which the code portion 1117 operates. The RW portion 1122 may be utilized by the code portion 1117 and the DSP 167 to preform operations that require both read and write operations to RAM 105, NVRAM 104, and/or the storage memory 106. In one aspect, the DSP 167 may utilize the code portion 1117 to write data to the RW portion 1122.

The storage memory data 1105 further comprises an image B 1110. The image B 1110 may be associated with the CPU 110, in one aspect. Comparing the image A 1107 to the image B 1110, the image A 1107 may be associated with the DSP 167 whereas the image B 1110 may be associated with the CPU 110. The image B 1110 may be configured slightly differently than the image A 1107 in that the image B 1110 has a code #1 portion 1130 and a code portion #2 1140. In one aspect, the code #1 portion 1130 may be configured to run in the RAM 105 whereas the code #2 portion 1140 may be configured to run within the NVRAM 104. The code #1 portion 1130 may be associated with a RO #1 portion 1132 and a RW #1 portion 1134. The RO #1 portion 1132 may contain code and/or data upon which the code #1 portion 1130 operates. The RW #1 portion 1134 may be utilized by the code #1 portion 1130 and the CPU 110 to perform operations that require both read and write operations to the storage memory 106.

Code #2 portion 1140 may be configured to operate within the NVRAM 104. A RO #2 portion 1142 may be associated with the image B 1110. The RO #2 portion 1142 may be configured to be operated on by the code #2 portion 1140 in conjunction with the CPU 110. Further, the RO #2 portion 1140 may be specifically configured to reside in NVRAM 104. In one aspect, the RO #2 portion 1142 may store secure data that need not or should not be altered when the SoC 102 is in operation. Two read-write portions 1144, 1146 are configured as two separate portions, RW #2-a portion 1144 and RW #2-b portion 1146. The RW portions 1144, 1146 are described in further details below. One of skill in the art will appreciate that the RW portions 1144, 1146 may be utilized similar to the other RW portions/memories described herein. However, there are advantages in having a plurality of RW portions 1144, 1146 as shall be described below.

One of skill in the art will appreciate that having independent code portions (e.g., code #1 portion 1130 and code #2 portion 1140) enables dynamic processing of tasks involving potentially separable functionality. As an illustrative example, the code #1 portion 1130 may correspond to an audio encoder whereas the code #2 portion 1140 may correspond to an audio decoder. If the user only desires to listen to music, then the exemplary code #1 portion 1130 (containing the exemplary audio encoder) would not be needed to playback audio; thus, the code #2 portion 1140 (containing the exemplary audio decoder) would be loaded in the memory (e.g., RAM 105, NVRAM 104, etc.). One of skill in the art will appreciate further, complex use cases that exceed the scope of this description but are wholly consistent with proposed system 100.

A file system 1112 may reside on the storage memory 106. The file system 1112 may be a conventional file system operable to store user data (e.g., photos, emails, apps, etc.). For example, the SoC 102 may access the file system 1112 to effect user-initiated operations (e.g. capturing and storing a digital photograph during a sporting event). In one aspect, the file system 1112 may be separate from the images 1107, 1110 as shown. In another aspect, the file system 1112 may encapsulate and contain the images 1107, 1110

FIG. 11b is a block diagram depicting the logical relationship of RAM data 1106. The RAM data 1106 may reside within the RAM 105, which may be a DRAM semiconductor in an aspect. In one aspect, the RAM data 1106 may need to be stored and subsequently retrieved from the storage memory 106 prior the RAM data 1106 being loaded into the RAM 105. One of skill in the art will appreciate that the RAM data 1106 may be smaller than the capacity of the RAM 105 such that the substantial entirety of an image A 1107A and an image B 1110A may both be loaded into the RAM 105. The image A 1107A comprises a code portion 1117A, a RO portion 1120A, a RW portion 1122A, and a stack 1125. In one aspect, the image A portion 1107A may be substantially similar to the image A portion 1107. However, in some aspects, the image A portion 1107A comprise a subset of the image A portion 1107. Likewise, the code portion 1117A, the RO portion 1120A, and the RW portion 1122A may be substantially similar to the code portion 1117, the RO portion 1120, and the RW portion 1122, respectively, because the RAM 105 may be configured to store the entirety of the image A 1107A. The stack 1125 is provided for completeness of the description and demonstrates that the image A 1107A is executing in the RAM 105.

The image B portion 1110A may comprise the code #1 portion 1130, the RO #1 portion 1132, and the RW #1 portion 1134, all of which are substantially similar to their respective portions in the storage memory data 1105. One of skill in the art will appreciate that the image B 1110A may be loaded from the storage memory 106 into the RAM 105.

A series of RAM buffers 1150 may reside within the RAM data 1106. The RAM buffers 1150 may provide static read or read-write memory for the various code portions 1117A, 1130 loaded into the RAM 105.

FIG. 11c is a block diagram depicting the logical relationship of NVRAM data 1107. In one aspect, the NVRAM data 1107 may be configured to reside within the NVRAM 104. However, prior to the NVRAM data 1107 being loaded in the NVRAM 105, the NVRAM data 1107 may need to be retrieved from the storage memory 106. The NVRAM data 1107 comprises an image A portion 1107B. The image A portion 1107B may be substantially similar to the image A portion 1107 as stored in the storage memory 106. Likewise, the image A portion 1107B may be substantially similar to the image A portion 1107A stored in the RAM 105. The stack 1125 may be present within the NVRAM data 1107 and operate substantially similar to how the stack 1125 operates in the RAM data 1106. Given the size limitations of current NVRAM implementations, the image A portion 1107B may be a subset of the entirety of the image A 1107, as stored in the storage memory 106. For example, the SoC 102 may be operating in a "power saving" mode and only need a subset of functionality offered by the DSP 167 because the "power saving" mode saves power, in part, by only utilizing the necessary portions of the image A 1107 to complete the boot operation. Therefore, the image A portion 1107B may have a code portion 1117B, a RO portion 1120B, and a RW portion 1122B, all of which may merely contain a subset of the full functionality available in their counterparts stored in the image A portion 1107 as correspondingly stored in the storage memory 106.

The image B portion 1110B may comprise the code #2 portion 1140, the RO #2 portion 1142, the RW #2-A portion 1144, the RW #2-B 1146, and the stack 1136. One of skill in the art will appreciate that the image B portion 1110B may be substantially similar to the image B portion 1110 stored in the storage memory 106. Again, given the size limitations of the NVRAM 104, some portions of the entirety of image B portion 1110 may be loaded as the image B portion 1110B. For example, the SoC 102 may be operating in a "power saving" mode and only need a subset of the functionality offered by the CPU 110 because the "power saving" mode saves power, in part, by only utilizing the necessary portions of the image B 1110 to complete the boot operation.

A series of operational control flags 1155 may reside within the NVRAM data 1107. In one aspect, the operational control flags 1155 may be utilized to indicate to the SoC 102 whether to boot in "normal" mode or in "power saving" mode. One of skill in the art will appreciate that the operational control flags 1155 may be stored in any operable portion of memory/storage to complete the intended functionality.

With respect to the various images 1107, 1107A, 1107B, 1110, 1110A, 1110B, one of skill in the art will appreciate that any one of these images may be statically or dynamically built to accommodate their operational environment and/or associated memory. For example, the image B 1110 may be built in one configuration (the image B 1110A) for the RAM 105. In comparison, the image B 1110 may be built in another configuration (the image B 1110B) for the NVRAM 104. Fewer or more images may be created for specific use cases, all of which are beyond the scope of this description. For example, software images that can benefit from the non-volatile execute-in-place ("XIP") behavior of the NVRAM 104 may choose to take advantage of such benefits. Since the NVRAM 104 may only be a fraction of the total memory available on the portable computing device, many of the images may be targeted to reside in the RAM 105. In addition, NVRAM 104, being smaller in capacity, may be operated at reduced performance levels (e.g., using bandwidth frequencies) compared to the RAM 105, resulting in power savings when operating solely from NVRAM 104 while RAM 105 is in a sleep mode, power collapse, etc.

Figure 12:
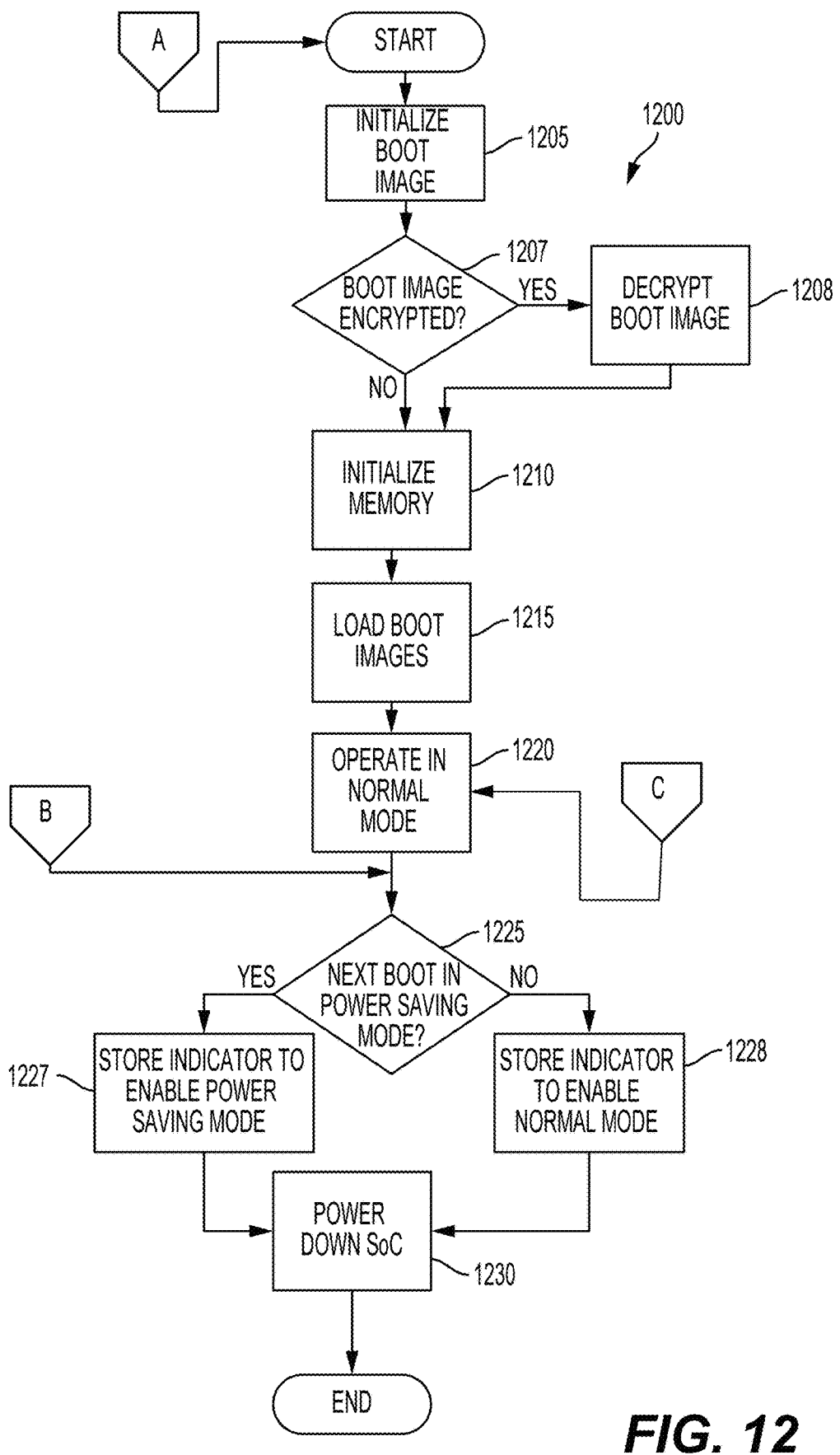
FIG. 12 is a flowchart depicting a process to boot the SoC in a "normal" mode.

FIG. 12 is a flowchart depicting a process 1200 to boot the SoC 102 in "normal mode." Beginning at START block, the process 1200 proceeds to block 1205 where the SoC 102 initializes the trusted boot program 130. In one aspect, the trusted boot program 130 may be accessed from the ROM 114 such that the SoC 102 may initialize the proper subsystems. The process 1200 proceeds to decision block 1207 where a determination is made as to whether the trusted boot program 130 is encrypted. If the trusted boot program 130 is encrypted, the process 1200 proceeds along the YES branch to block 1208. At block 1208, the trusted boot program 130 may be encrypted and require decryption by the ICE 160. For example, the CPU 110 may access the information stored in the fuses 132 to utilize the keygen engine 165 such that the trusted boot program 130 may be decrypted by the ICE 160. One of skill in the art will appreciate that a number of alternative mechanisms to securely boot the SoC 102 may be utilized and would be beyond the scope of this detailed description. Further, one of skill in the art may opt to not encrypt the trusted boot program 130 if the operating environment of the SoC 102 allows such a lack of security. Conversely, the encryption/decryption process may need to be even more robust than the one described herein; again, the operating environment of the SoC 102 would influence one of skill in the art to enable the proper amount of security.

Returning to decision block 1207, the process 1200 may determine the trusted boot program 130 does not need decryption, and the process 1200 may then proceed to block 1210.

At block 1210, the process 1200 initializes the various types of memory within the SoC 102. In one aspect, the process 1200 initializes the storage memory 106, the RAM 105, the NVRAM 104, or combination thereof. One of skill in the art will appreciate other memory and storage subsystems may need initialization. The process 1200 then proceeds to block 1215 where the trusted secure program 130 loads the image A and the image B portions 1107, 1110 into the RAM 105. In another aspect, the trusted secure program 130 loads the image A and the image B portions 1107, 1110 into the SRAM 112. One of skill in the art may allocate the image A and the image B portions 1107, 1110 to different memories depending on the intended use of the SoC 102. In one aspect, the process 1200 authenticates the image A and the image B portions 1107, 1110 after the portions 1107, 1110 have been loaded.

The process 1200 then proceeds to block 1220 where the SoC 102 operates in "normal" mode. In one aspect, "normal" mode begins with the process 1200 resetting the DSP 167 to its start state. Further, the process 1200 may instruct the CPU 110 to load the high-level operating system ("HLOS"). At this point in the process 1200, the user of the portable computing device may see a series of boot messages on the display (not shown) of the portable computing device. Likewise, start-up-related sounds may be played by the portable computing device indicating a successful boot.

The process 1200 proceeds to the decision block 1225 to make a determination as to whether to have the subsequent boot of the SoC 102 be in "normal" mode or "power saving" mode. Prior to decision block 1225, the user may have the portable computing device in operation for a little as seconds or as long as months, thus one of skill in the art will appreciate that a non-trivial amount of time may pass as process 1200 moves from block 1220 to decision block

1225. If the process 1200 determines that the SoC 102 should boot in "normal" mode, the process 1200 proceeds along the NO branch to block 1228. At block 1228, the flag 148 may be set in the power management controller 108. The flag 148 may be utilized at a later time to indicate that the subsequent boot should be in "normal" mode.

Returning back to decision block 1225, the process 1200 may determine that the subsequent boot will be in "power saving" mode. The process 1200 then proceeds along the YES branch to block 1227. At block 1227, the flag 148 may be set to indicate that the subsequent boot should be in "power saving" mode. Again, the flag 148 may be located in the power management controller 108, however, one of skill in the art will appreciate that the flag 148 could be stored in any location operable to store dynamic data available during an initial or subsequent boot.

The process 1200 then proceeds from both blocks 1227, 1228 to the block 1230 where the SoC 102 is powered down. The power down operation of the SoC 102 is beyond the scope of this description, but one of skill in the art will appreciate that a myriad of "clean-up" operations may need to be performed to enable a successful, subsequent boot of the SoC 102. The process 1200 then proceeds to the END block where the process 1200 terminates. As one of skill in the art will appreciate, under a "normal" mode boot, the SoC 102 may repeat the process 1200 several times to achieve any number of successful, subsequent boots.

Figure 13:
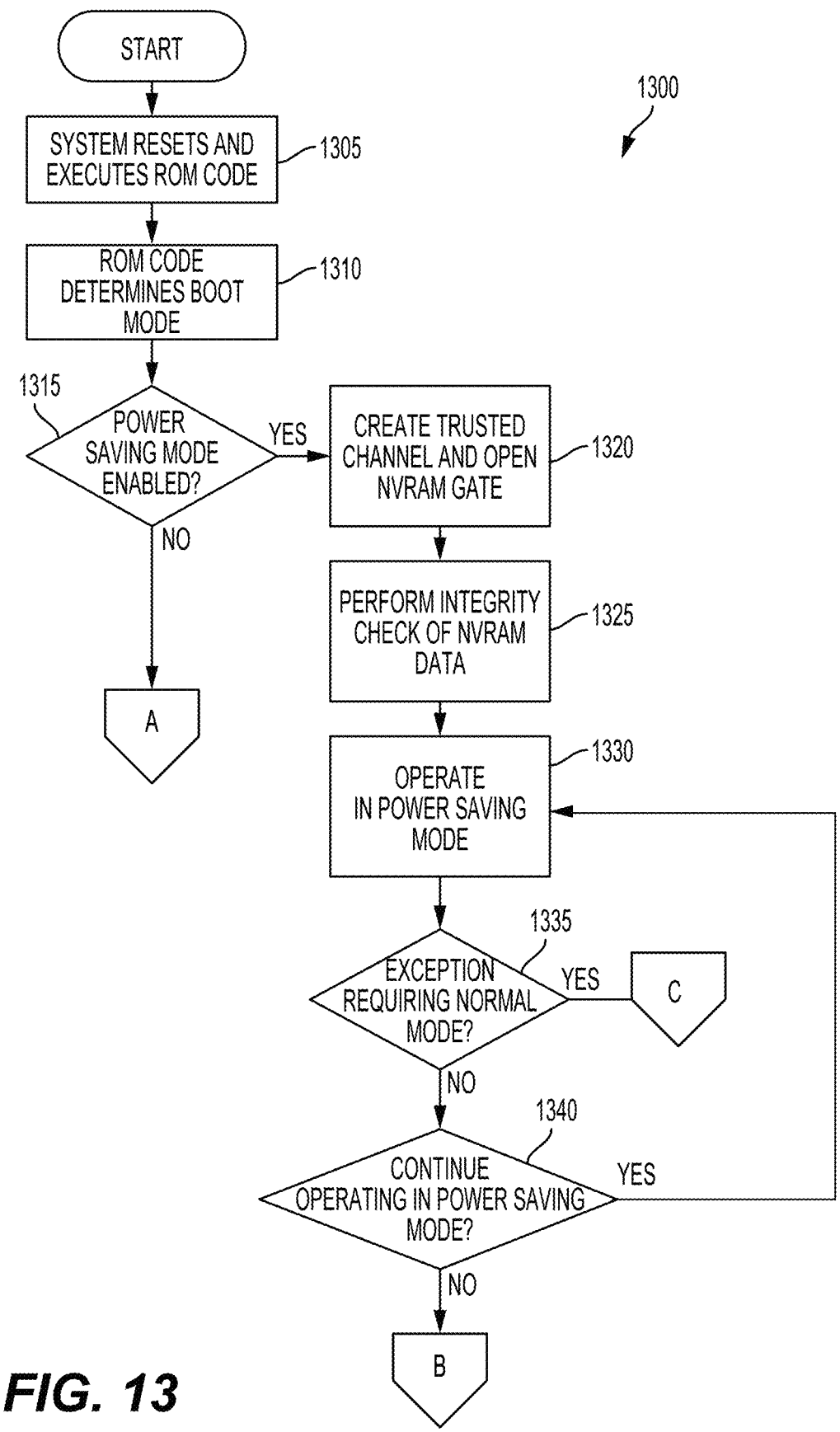
FIG. 13 illustrates an exemplary process to boot the SoC 102 in a "power saving" mode.

FIG. 13 depicts a process 1300 to boot the SoC 102 in a "power saving" mode. The process 1300 begins at the START block and then proceeds to block 1305. At block 1305, the system resets and executes the trusted boot program 130 stored in the ROM 114. The trusted boot program 130 may need to conduct other operations to ascertain the stability of the SoC 102 and bring up the SoC's 102 various subsystems as depicted in FIGS. 1 & 8.

The process 1300 proceeds to block 1310 where the process 1300 receives information to decide whether the SoC 102 will boot in "normal" mode or in "power saving" mode. In one aspect, the power management controller 108 sends the flag 148 to the SoC 102 such that the trusted boot program 130 may determine whether to boot in "normal" mode or "power saving" mode. In another aspect, the trusted boot program 130 may receive a general purpose input/output ("GPIO") command via the bus 142 from the external AP 140. In one aspect, the GPIO command may be substantially similar to the flag 148 stored in the power management controller 108. One of skill in the art will appreciate that the illustrative examples above only represent some of the many ways for the trusted boot program 130 to receive an indication as to whether to boot in the "normal" mode or in the "power saving" mode.

The process 1300 proceeds to the decision block 1315. If the SoC 102 has been determined to boot in the "normal" mode, the process 1300 proceeds along the NO branch to callout block A where process 1300 logically proceeds to block A as depicted in FIG. 12, at which point process 1200 may proceed to operate the SoC's 102 boot process described therein.

Returning to the decision block 1315, the process 1300 may determine that the SoC 102 may boot in the "power saving" mode at which point the process 1300 proceeds along the YES branch to block 1320. One of skill in the art will understand that the SoC 102 may be configured in advance using the process 900 outlined in FIG. 9 and its subsequent description above. In such an aspect, the NVRAM 104 may be configured with a gate mechanism 172 operable to control access to the NVRAM 104. The process 1300 may utilize the process 1000 as outlined in FIG. 10 and its associated description. Once the gate mechanism 172 has been opened, the NVRAM 104 may be accessed by the SoC 102 and the process 1300 proceeds to the block 1325.

At block 1325, the process 1300 may need to perform an integrity check of the data stored in the NVRAM 104. In one aspect, the NVRAM 105 may contain data similar to the NVRAM data 1107 as depicted in FIG. 11c and described above. In one aspect, the NVRAM data 1107 may be configured in advance to execute within the NVRAM 104. One of skill in the art will appreciate that the storage capacity of the NVRAM 104 may smaller than other memories located within the SoC 102 (e.g., the RAM 105, the storage memory 106, etc.). As such, the NVRAM data 1107 may have two portions of RW data, viz., the RW #2-A portion 1144 and the RW #2-B portion 1146. The RW portions 1144, 1146 may be utilized by the process 1300 to provide a mechanism to send excess data to other storage devices, which have sufficient capacity (or desired performance characteristics). For example, the RW #2-A portion 1144 may be primarily used to store RW data. Once the RW #2-A portion 1144 has been determined to be too full, the process 1300 may begin to send data located in the RW #2-A portion 1144 to other storage devices or memories within the SoC 102. While the RW #2-A portion 1144 is considered to be unusable, the process 1300 may utilize the RW #2-B portion 1146 in lieu of the RW #2-A portion 1144. One of skill in the art will appreciate there are a number of mechanisms to shift data between various blocks of storage and/or memory. As such, one of skill in the art may develop a substantially similar method to ensure the capacity of the NVRAM 104 is not exceeded while the SoC 102 is operating in the "power saving" mode.

The process 1300 then proceeds to block 1330 where the SoC 102 operates in "power saving" mode. In the "power saving" mode, unused subsystems within the SoC 102 may be powered down or placed in a sleep mode. In one aspect, the RW #2-A portion 1144 may be sufficient in capacity, latency, and/or power to perform the operations of the SoC 102 in which case the RAM controller 121 and the RAM 105 may be powered down or placed in a sleep mode. Further, the process 1300 may determine the storage memory controller 122 and the associated storage memory 106 may be powered down or placed in a sleep mode. One of skill in the art will appreciate the inherent advantages of being able to operate the SoC 102 by leveraging the NVRAM 104 such that many subsystems within the SoC 102 may be powered down or put into a sleep state.

The process 1300 proceeds to the decision block 1335 where an exception to operating may be encountered. If an exception is encountered, the process 1300 may proceed along the YES branch to callout block C, which continues in FIG. 12 with its related callout block C at which point process 1200 may return the SoC 102 to the "normal" operating mode. Returning to the decision block 1335 of FIG. 13, the process 1300 may proceed along the NO branch if no exception is encountered while operating in the "power saving" mode.

The process 1300 proceeds to the decision block 1340 where a determination is made as to whether to continue operating in "power saving" mode. If the process 1300 continues operating in the "power saving" mode, the process 1300 proceeds along the YES branch to block 1330 where the "power saving" mode operation continues. Returning to the decision block 1340, the process 1300 may determine that "power saving" mode should terminate. In one aspect, the termination of the "power saving" mode may be by operation of the user (e.g., the user powers down the portable computing device containing SoC 102). If the "power saving" mode should terminate, the process 1300 proceeds along the NO branch to callout block B which corresponds to callout block B of FIG. 12 at which point the process 1200 logically continues therein.

Figure 14:
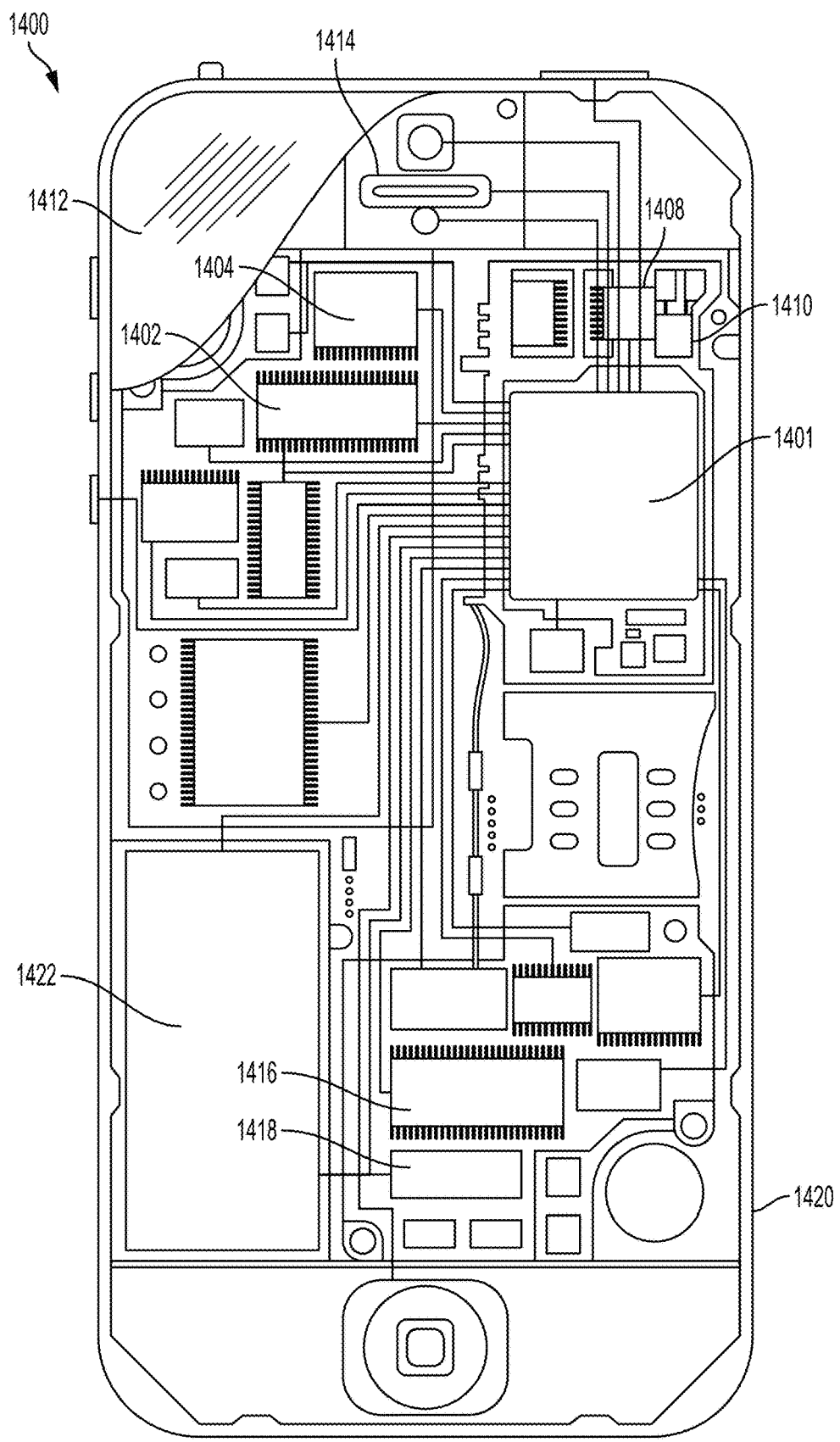
FIG. 14 is a block diagram of an aspect of a portable computing device for incorporating the system and method described herein.

The various aspects (including, but not limited to, aspects discussed above with reference to FIGS. 1 through 13) may be implemented in any of a variety of the computing devices including a mobile device 1400, an example of which is illustrated in FIG. 14. As such, the mobile device 1400 may implement the processes 1200 and/or 1300 in FIGS. 12 and/or 13. For example, the mobile device 1400 may include a processor 1401 coupled to a touch screen controller 1404 and an internal memory 1402. The processor 1401 may be one or more multicore integrated circuits (ICs) designated for general or specific processing tasks. In one aspect, the processor 1401 may be substantially the same as SoC 102 described above. The internal memory 1402 may be volatile or non-volatile memory, and may also be secure and/or encrypted memory, or unsecure and/or unencrypted memory, or any combination thereof. The touch screen controller 1404 and the processor 1401 may also be coupled to a touch screen panel 1412, such as a resistive-sensing touch screen, capacitive-sensing touch screen, infrared sensing touch screen, etc.

The mobile device 1400 may have one or more radio signal transceivers 1408 (e.g., Peanut®, Bluetooth®, Zigbee®, Wi-Fi, RF, cellular, etc.) and antennae 1410, for sending and receiving, coupled to each other and/or to the processor 1401. The transceivers 1408 and antennae 1410 may be used with the above-mentioned circuitry to implement various wireless transmission protocol stacks and interfaces and to establish the various wireless links discussed herein. The mobile device 1400 may include one or more cellular network wireless modem chips 1416, such as one cellular network wireless modem chip, two cellular network wireless modem chips, three cellular network wireless modem chips, four cellular network wireless modem chips, or more than four cellular network wireless modem chips, that enables communication via one or more cellular networks and that are coupled to the processor 1401. The one or more cellular network wireless modem chips 1416 may enable the mobile device 1400 to receive services from one or more cellular networks (e.g., CDMA, TDMA, GSM, 3G, 4G, 5G, LTE, or any other type of cellular network), to implement various wireless transmission protocol stacks and interfaces, and to establish the various wireless links discussed herein.

The mobile device 1400 may include a peripheral device connection interface 1418 coupled to the processor 1401. The peripheral device connection interface 1418 may be singularly configured to accept one type of connection, or multiply configured to accept various types of physical and communication connections, common or proprietary, such as USB, FireWire, Thunderbolt, Ethernet, or PCIe. The peripheral device connection interface 1418 may also be coupled to a similarly configured peripheral device connection port (not shown). The mobile device 1400 may also include speakers 1414 for providing audio outputs.

The mobile device 1400 may also include a housing 1420, constructed of a plastic, metal, or a combination of materials, for containing all or some of the components discussed herein. The mobile device 1400 may include a power source 1422 coupled to the processor 1401, such as a disposable or rechargeable battery. The rechargeable battery may also be coupled to the peripheral device connection port to receive a charging current from a source external to the mobile device 1400.

It should be appreciated that the systems and methods described above for providing secure access to the NVRAM 104, initializing the NVRAM 104, and/or operating the SoC in the "power saving" mode may support various low-power use cases. In embodiments related to a mobile device, for example, a low-power use case may comprise an operational mode or a state of the device that is desired to run for a length of time without significantly consuming battery energy. The mode or state may or may not involve user interaction (e.g., listening, viewing, keypress, heart sensor, etc.), and may or may not be autonomous (e.g., modem paging, system parameter wake-up, etc.). The length of time may be brief (milliseconds) or long-lasting (hours or days). The use case may be one-time, such as, for example, watching a movie, or may be periodic (e.g., phone paging). A software application or program may contain and execute a single or multiple use cases. In general, low-power use cases may not require large amounts of computation (CPU, GPU, or FPU cycles) or data transfer (wired or wireless bandwidth). Furthermore, low-power use cases may leverage low energy physical traits, may rely on smaller software tasks, may only be active for brief periods of time, or may engage a limited subset of SoC hardware. It should be appreciated that such a limited subset of SoC hardware may be termed a "low-power island" because it is power isolated from the rest of the SoC such that the low-power island may remain actively powered while the rest of the SoC is powered off. The rest of the SoC may still be intermittently and briefly powered on only as needed.

Figure 15:
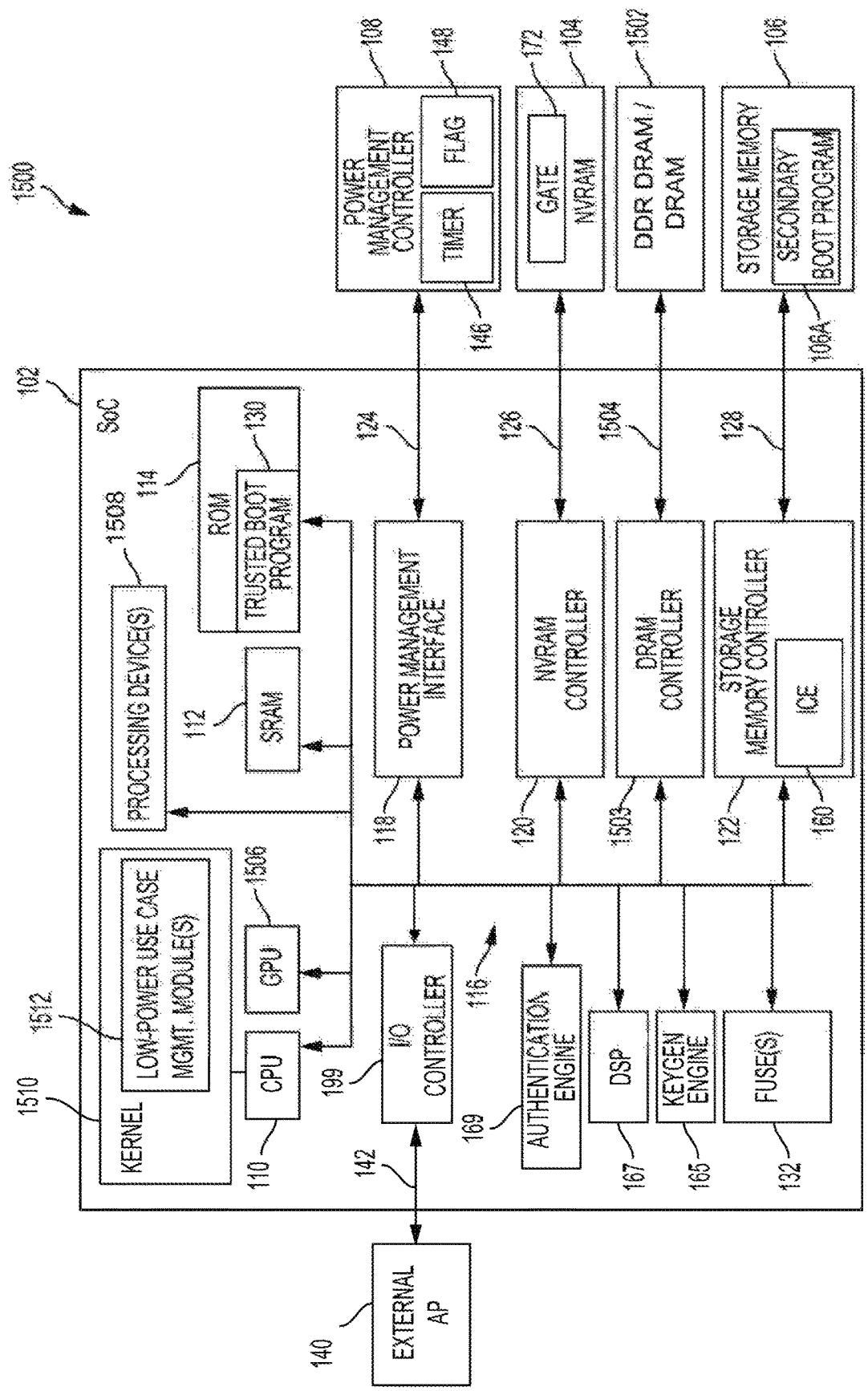
FIG. 15 is a block diagram of an embodiment of a system for managing SoC memory access for low-power use cases via NVRAM.

FIG. 15 is a block diagram of an embodiment of a system 1500 for managing SoC memory access for low-power use cases via the NVRAM 104. The system 1500 may be generally configured in a similar manner as the system 100 (FIG. 1) or the system 800 (FIG. 8). In the embodiment of FIG. 15, the SoC 102 may be electrically coupled to a volatile memory, such as, for example, dynamic random access memory (DRAM) 1502 via a double data rate (DDR) interface 1504. DRAM 1502 may comprise one or more DRAM chips with each chip having a plurality of banks (e.g., 8 banks per DRAM chip). Communication between the SoC 102 and the DRAM 1502 may be controlled by a DRAM controller 1503, which is electrically coupled to the SoC bus 116.

As further illustrated in FIG. 15, the SoC 102 may further comprise low-power use case management module(s) 1512. One or more of the low-power use case management module(s) 1512 may be implemented via an operating system kernel 1510. As described below in more detail, the low-power use case management module(s) 1512 comprise the logic and/or functionality for leveraging the secure NVRAM 104 to enable the SoC 102 to operate in specially-configured "power-saving" mode referred to as "a low-power island" configuration. It should be appreciated that the term "low-power island" configuration enables one or more power-saving software programs to be executed by corresponding SoC processing devices from the secure NVRAM 104 while other processing devices on the SoC 102 are powered down to save SoC cost and minimize power consumption.

In the embodiment of FIG. 15, the SoC 102 comprises various SoC processing devices, including, for example, CPU 110, a general processing unit (GPU) 1506, one or more DSP(s) 167, or other processing devices 1508 (e.g., microcontrollers, state machines, etc.). The "low-power island" configuration may isolate one or more of the SoC processing devices for low-power operation via the NVRAM 104 while the other SoC processing devices and/or SoC components are powered down. It should be appreciated that the "low-power island" configuration may be particularly advantageous in certain low-power use cases where the isolation of one or more SoC processing device(s) may significantly reduce power consumption.

Figure 16:
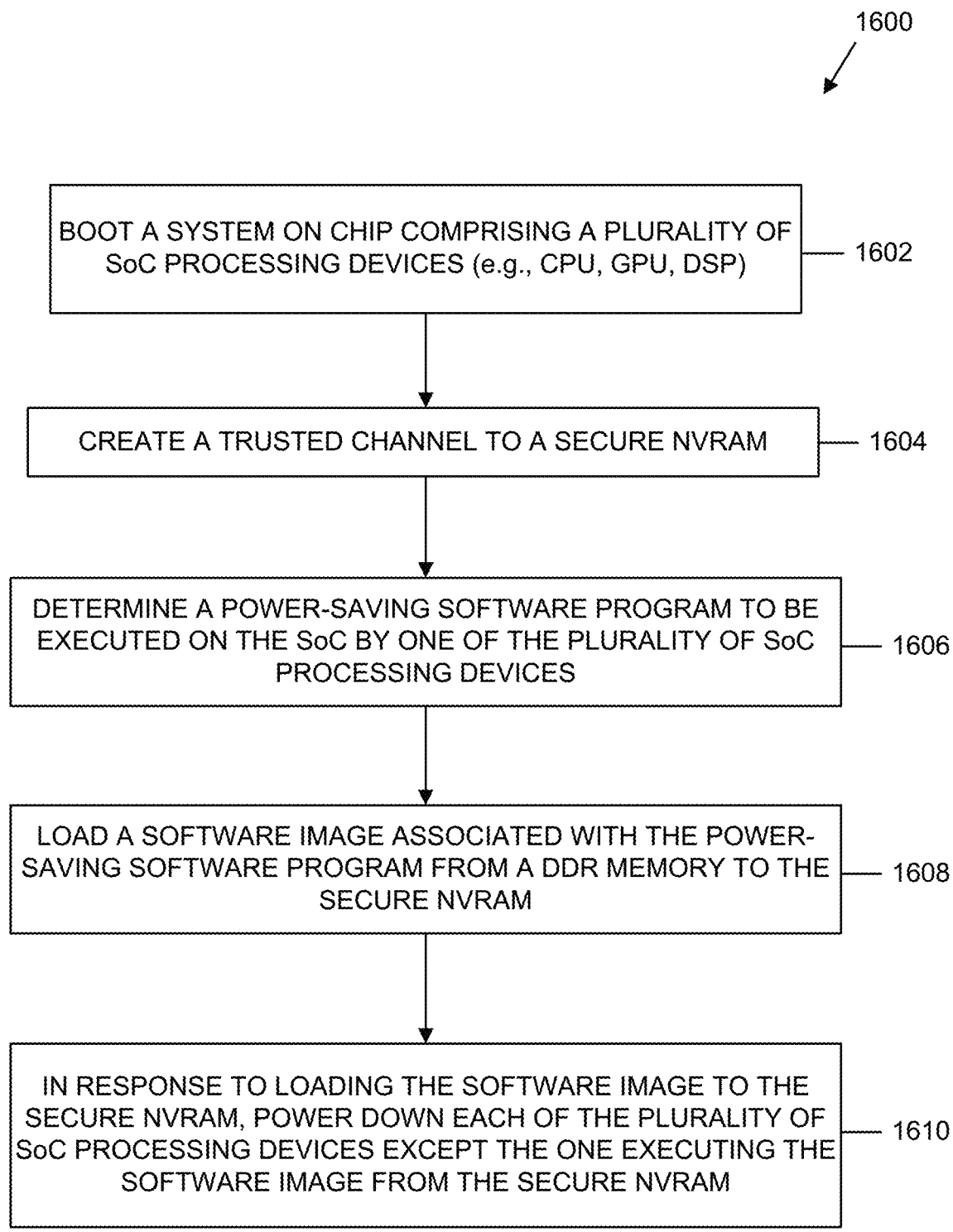
FIG. 16 is a flowchart illustrating an embodiment of a method implemented in the system of FIG. 15 for managing SoC memory access for low-power uses cases via NVRAM.

Various embodiments of "low-power island" configurations and corresponding low-power use cases are described below in more detail below. An exemplary embodiment of a method 1600 for managing SoC memory access for low-power uses cases via the NVRAM 104 is illustrated in FIG. 16. At block 1602, the SoC 102 comprising a plurality of SoC processing devices may be booted. The SoC 102 may be booted in the manner described above, via a trusted boot program 130, to create a trusted channel between the SoC 102 and the secure NVRAM 104. At block 1606, depending on the particular use case being supported, the method 1600 may determine one or more power-saving software programs to be executed on the SoC 102 by corresponding SoC processing device(s). In accordance with the supported use case, low-power software image(s) associated with the power-saving software program(s) may be loaded to the secure NVRAM 104. In response to loading the software image(s) to the secure NVRAM 104, the method 1600 powers down each of the plurality of SoC processing devices (and/or other system or SoC components) except the SoC processing device(s) executing the software image(s) from the secure NVRAM 104. The system 1500 may support a plurality of low-power use cases, while the size of the NVRAM 104, for cost reason, may not support all the low-power use cases simultaneously, or may not able to support the normal run-time software as is without reducing the size. Therefore, it should be appreciated that a reduced-sized version of the software may be developed, or a subset of the run-time software functions may be identified and loaded to the NVRAM at step 1608. This may also reduce the amount of data to be loaded and minimize the energy overhead of entering the low power use case. The selection of which software image to be loaded to the NVRAM 104 may depend on the low-power use case at the moment of the execution. The system may also swap another software image into the NVRAM 104 when the use case changes.

Figure 17:
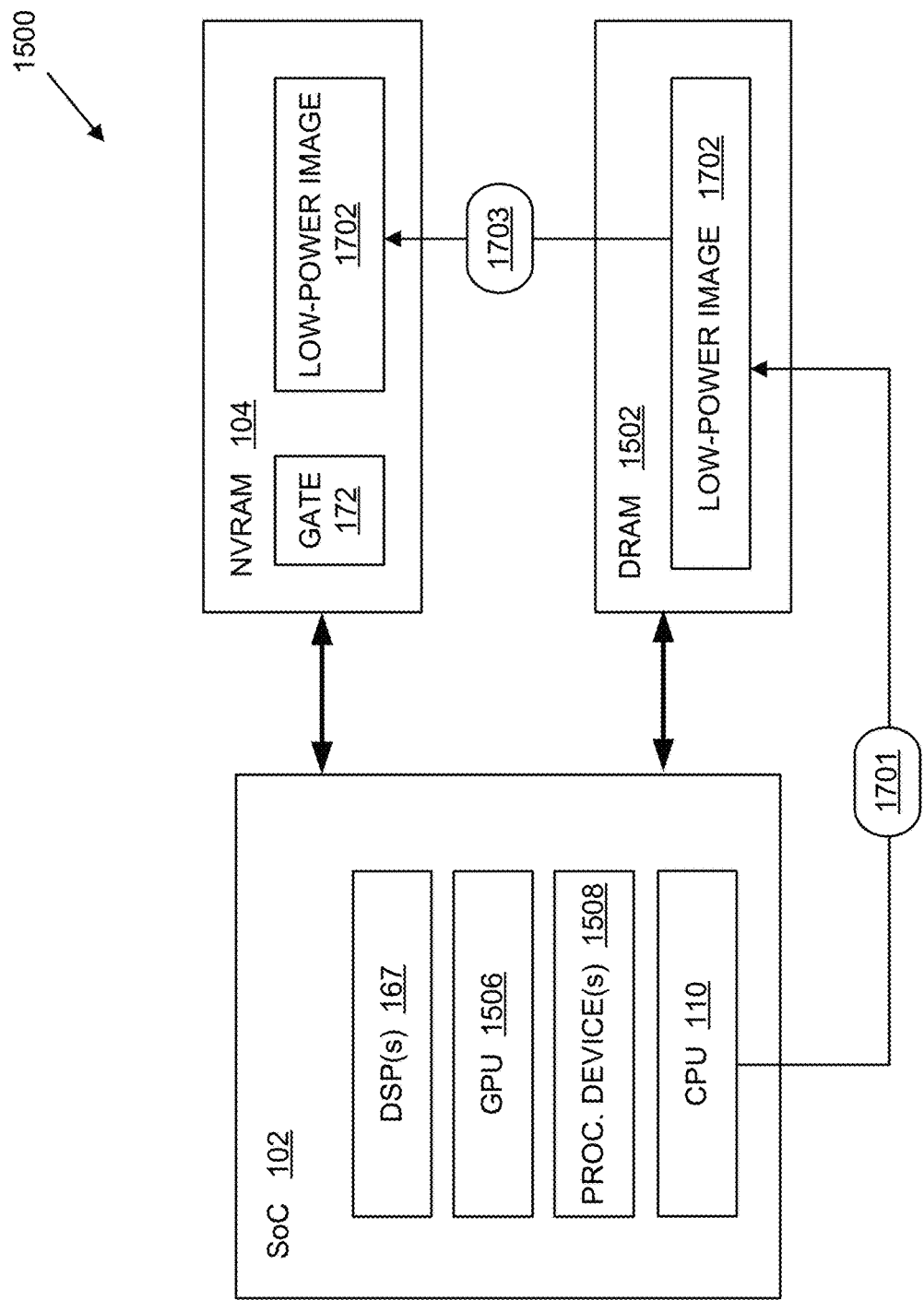
FIG. 17 is a combined block/flow diagram illustrating an exemplary low-power SoC island configuration for the DSP in the system of FIG. 15.
Figure 18:
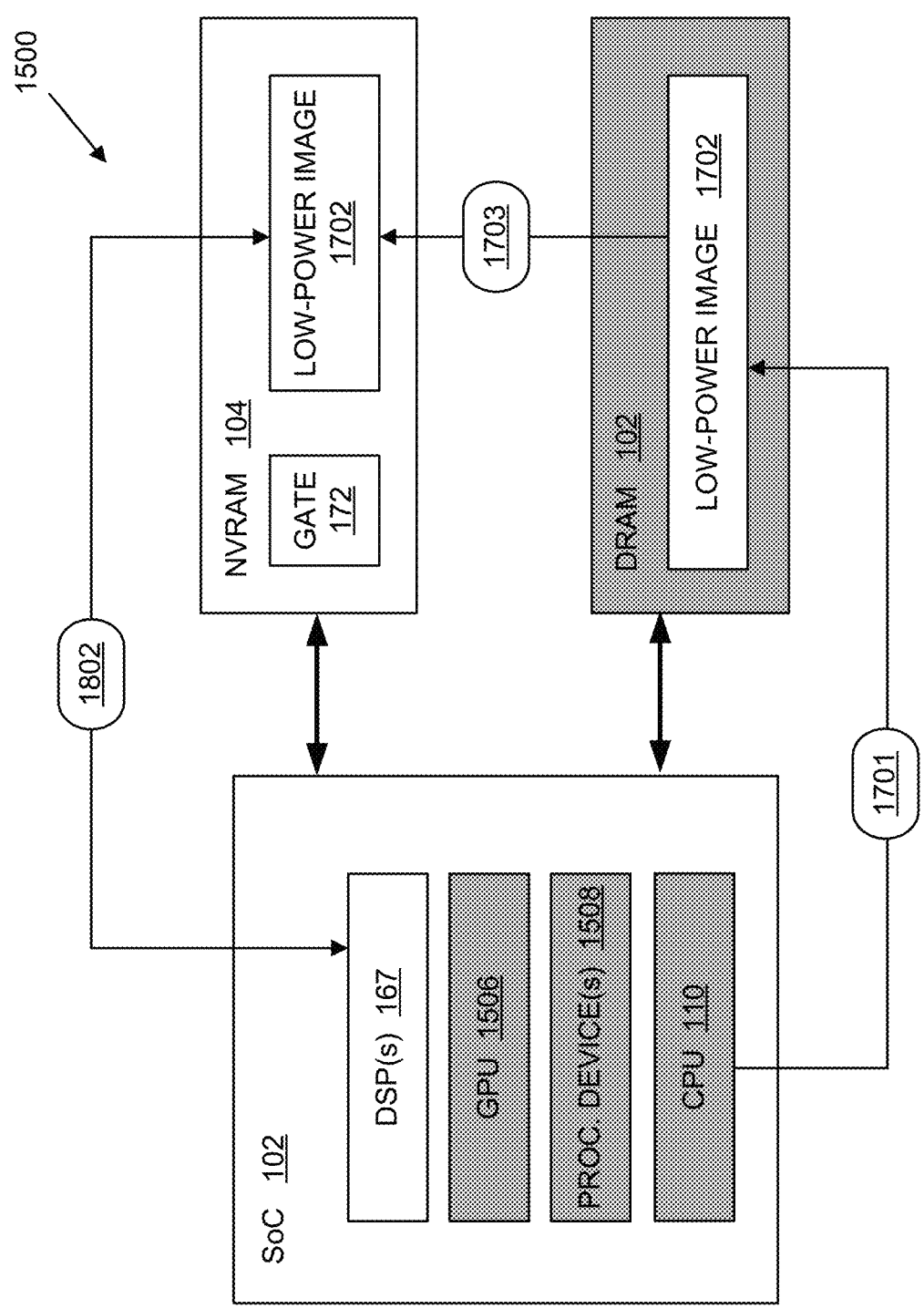
FIG. 18 illustrates the system of FIG. 17 in which only the digital signal processor and the NVRAM are powered up in the low-power SoC island configuration.

FIGS. 17 & 18 illustrate an exemplary low-power SoC island configuration for isolating one of the DSP(s) 167 in the system 1500. It should be appreciated that isolating a single DSP 167 on the SoC 102 may be particularly beneficial for any of the following, or other, DSP use cases: motion sensor detection, WLAN positioning, and/or modem paging on a portable computing device; heart rate monitor or pedometer on a wearable device; sensor(s) on an Internet of things (IoT) device; etc.

As illustrated in FIG. 17, at step 1701, the CPU 110 may load a low-power software image 1702 to DRAM 1502. The low-power software image 1702 comprises the executable logic and/or functionality of a power-saving program associated with the DSP 167. The low-power software image 1702 may be dynamically loaded during runtime or statically loaded at boot time. In dynamic loading embodiments, the executable logic and/or functionality of a power-saving program may not be loaded to the destination for execution upon the initialization process of the system 1500. This method may be used for use cases where it is not clear whether the program will be needed or not, or where the processor has multiple low-power use cases and the program for each use case can be swapped in and out of the low-power island upon the triggering of the specific use case. In static loading embodiments, the program may be loaded to the destination for execution upon the initialization process of the system 1500. For example, in sensor-type DSP use cases, the low-power software image 1702 may be dynamically loaded, where the need to load (and later unload) the image, the choice of image, and any settings and configuration of the image may be performed just prior to use case execution. In other DSP use cases (e.g., WLAN, modem), the low-power software image 1702 may be statically loaded, where the image is known to be needed and is loaded at boot or at application startup. It should be appreciated that step 1701 may use CPU 110 to load the images from storage to DRAM 1502, in comparison to existing solutions in which the storage may be exclusively controlled by the HLOS. In some embodiments, the storage architecture may provide direct access for masters other than the HLOS on the CPU 110, such as the DSP. In these embodiments, step 1701 may be bypassed and the program running on the DSP may directly access the storage device to load the low-power image into NVRAM 104 if the overall system energy of such a scheme shows benefit over the CPU loading scheme with step 1701.

When a low-power island configuration is triggered (step 1703), the low-power software image 1702 is loaded from the DRAM 1502 to the secure NVRAM 104. It should be appreciated that the low-power island configuration may be triggered in various ways. In one embodiment, certain types of low-power uses cases (e.g., voice activation control, location detection, motion sensing, low-power/low-resolution camera, etc.) may be controlled by a user via user interface controls. For example, if a low battery threshold is reached, certain types of low-power use cases may be activated. In other embodiments, the low-power island configuration may be dynamically triggered via an application program interface (API) that determines if an application may be run in an "always on" mode. In further embodiments, a daemon application may arbitrate low-power aware use cases to be run. After step 1703, the low-power software image 1702 may no longer be required in the DRAM 1502. In an embodiment, the system 1500 may reclaim the memory to be used by the kernel 1510 by other purpose. For example, when another low-power use case is triggered, the initial low-power image 1702 may be copied back to the DRAM 1502 and a new low-power image for the new use case may be loaded to the NVRAM 104. With this approach, the system may reduce the memory pressure on DRAM 1502 and/or reduce the DRAM size. In another embodiment, the system 1500 may keep the low-power software image 1702 intact in the DRAM 1502.

Referring to FIG. 18, after the low-power software image 1702 is loaded to the secure NVRAM 104, power may be disabled to the other SoC processing devices (illustrated as being greyed-out). At step 1802, the DSP 167 may execute the low-power software image 1702 from the secure NVRAM 104.

Figure 19:
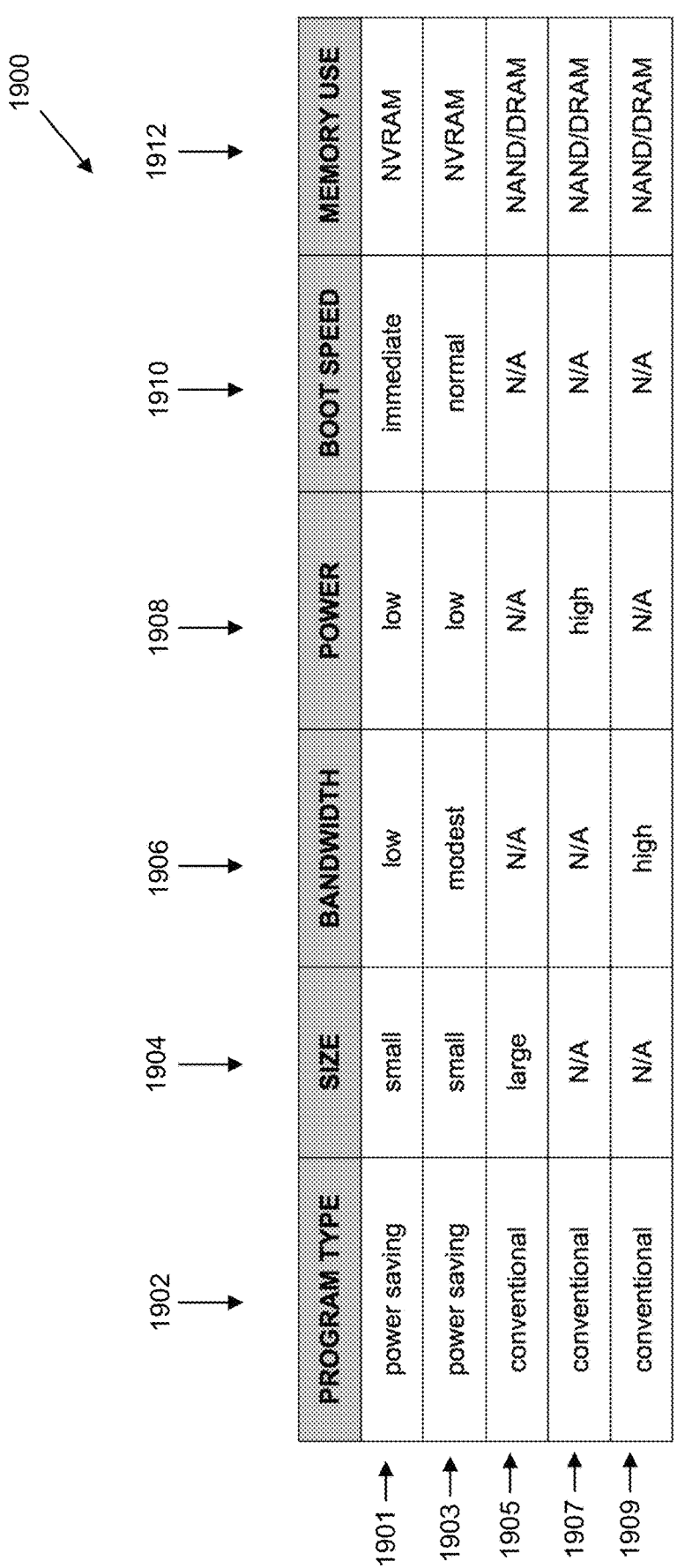
FIG. 19 is a data table for enabling software programs to specify the type of SoC memory access.

FIG. 19 is a data table 1900 that may be integrated with the low-power use case management module(s) 1512. The data table 1900 enables software programs (represented by rows 1901, 1903, 1905, 1907, 1909) to programmatically compete for the opportunity to access the secure NVRAM 104 in the low-power island mode. Software programs may provide "hints" to the operating system kernel 1510. In an embodiment, the hint data may comprise data values associated with columns 1902, 1904, 1906, 1908, 1910, and 1912. Hint 1902 specifies a program type 1902 (power-saving vs. conventional). Hint 1904 specifies a program size value. Hint 1906 specifies a bandwidth value. Hint 1908 specifies a power value. Hint 1910 specifies a boot speed. Hint 1912 specifies a memory access type (NVRAM access vs. NAND/DRAM access).

Figure 20:
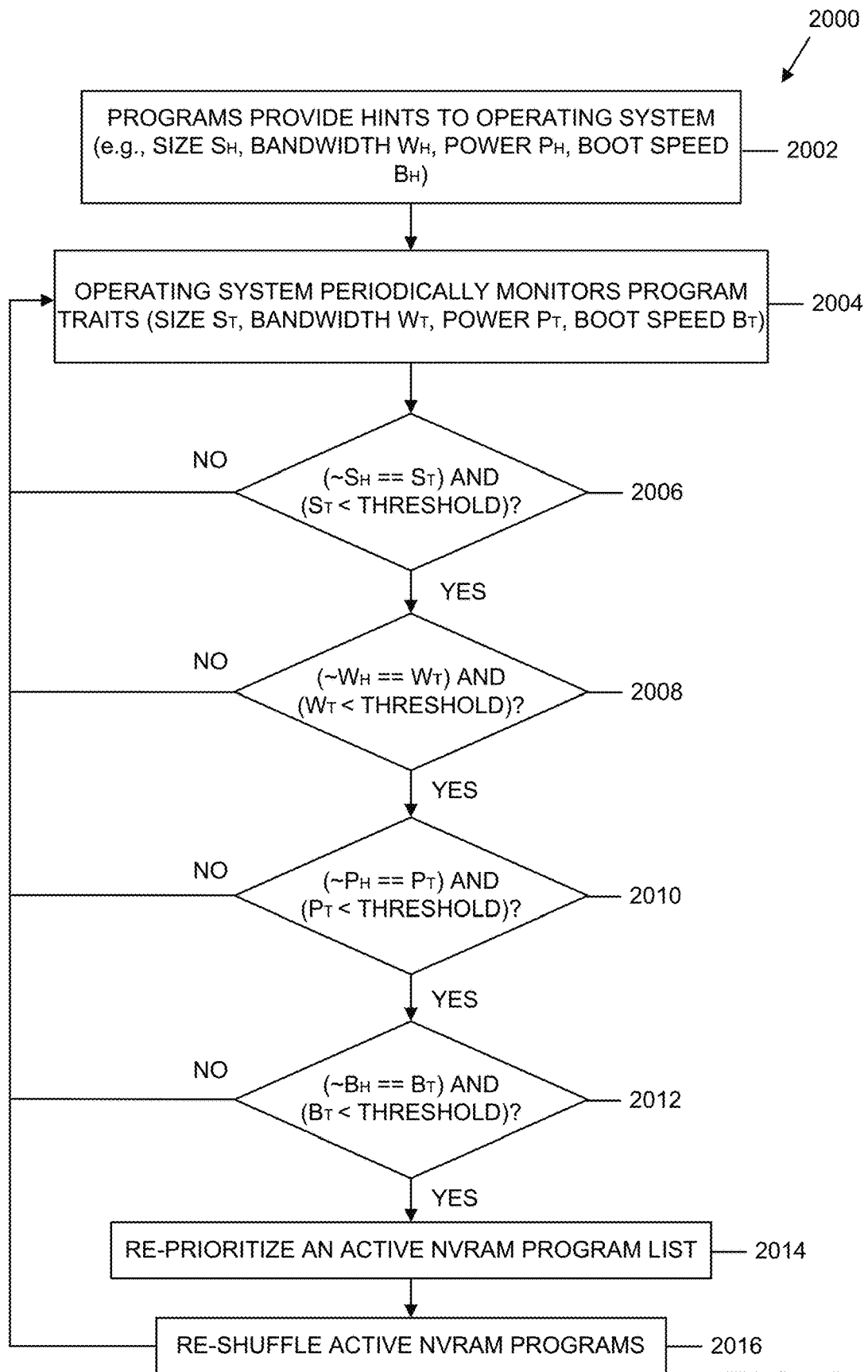
FIG. 20 is a flowchart illustrating an embodiment of a method for prioritizing software programs to be provided low-power NVRAM access in the system of FIG. 15.

FIG. 20 is a flowchart illustrating an embodiment of a method 2000 for prioritizing software programs to be provided low-power NVRAM access in the system of FIG. 15. At step 2002, the operating system may be passed metadata or "hints" from a program, a processor, or a task. It should be appreciated that a hint may characterize the behavior of the program, process, or task. In exemplary embodiments, the characteristics may comprise, for example, the total size S of the program (in Megabytes), the maximum and/or average amount of memory bandwidth W required for the program to run (in Megabytes per second), the average power P (in milliJoules or energy equivalent), and the boot speed B (in milliseconds or time equivalent). These characteristics may comprise estimates from the program creator/author and provide guidance to the operating system on whether to treat this program as low power (or not). At step 2004, the operating system may also use hardware monitors within the SoC 102 to obtain approximate measurements of these same characteristics as the program, process, or task executes. The measured characteristics may be referred to as "traits". The hints and traits may comprise separate inputs to the method 2000. For example, the size hint $S_H$ may be a first value provided by the program's creator/author, and the size trait $S_T$ may be a second value measured by the SoC hardware while the program is executing. Each hint and corresponding trait may be compared to each other and also to a predetermined threshold. At step 2006, the size hint $S_H$ may be compared with the size trait $S_T$ to determine whether the values are consistent. This comparison may employ predetermined or calculated margins or thresholds and need not be exact. As an example, $S_H$ and $S_T$ may be allowed to differ from each other by, for example, 50%. In addition, the size trait $S_T$ may also be compared against a maximum threshold. As an example, the size trait $S_T$ may be measured at 25 Megabytes and the predetermined size threshold may be set to 40 Megabytes. The favorable difference of 15 Megabytes (size trait is less than threshold) is stored and later used for re-prioritizing the NVRAM active program list. The size threshold may be applicable to all low-power use case programs, a category of low-power use case programs, or a specific low-power use case program. If the hint and trait are similar, and if the trait does not exceed the threshold, then the method 2000 progresses to the next comparison. If either the hint and trait are dissimilar, or if the trait exceeds the threshold, then the flow skips to step 2016. At step 2008, the hint and trait for bandwidth may be compared. At step 2010, the hint and trait for power may be compared. At step 2012, the hint and trait for boot speed may be compared. At step 2014, after the program has successfully completed all comparison steps 2006, 2008, 2010, and 2012, then the list of all low-power use case programs residing in NVRAM may be re-prioritized based on the result of the comparisons. For example, programs having favorable comparisons (e.g., smaller size, lower bandwidth, lower power, and/or shorter boot speed than the predetermined thresholds), may be assigned a higher priority than programs having less favorable comparisons. At step 2016, the priority list may be used to manage the actively running programs on NVRAM. Step 2014 may re-calculate the priority list, whereas step 2016 enforces it. Actively running NVRAM programs with a priority inversion (i.e., lower priority than another program(s) that is not running in NVRAM) may be removed from NVRAM. This may be done by forking the existing NVRAM program such that a copy of it is created in regular system memory. Program execution may resume in regular system memory and then the original (currently unused) NVRAM program may be removed and the space in NVRAM memory freed. This process may be repeated until the NVRAM program priority is reconciled with the priority list. To prevent unnecessary thrashing (i.e., programs continually being rotated in and out of NVRAM), either time hysteresis (delay before re-prioritization forces a re-shuffling) or distance hysteresis (magnitude of the priority inversion must meet a minimum threshold) may be employed.

Figure 21:
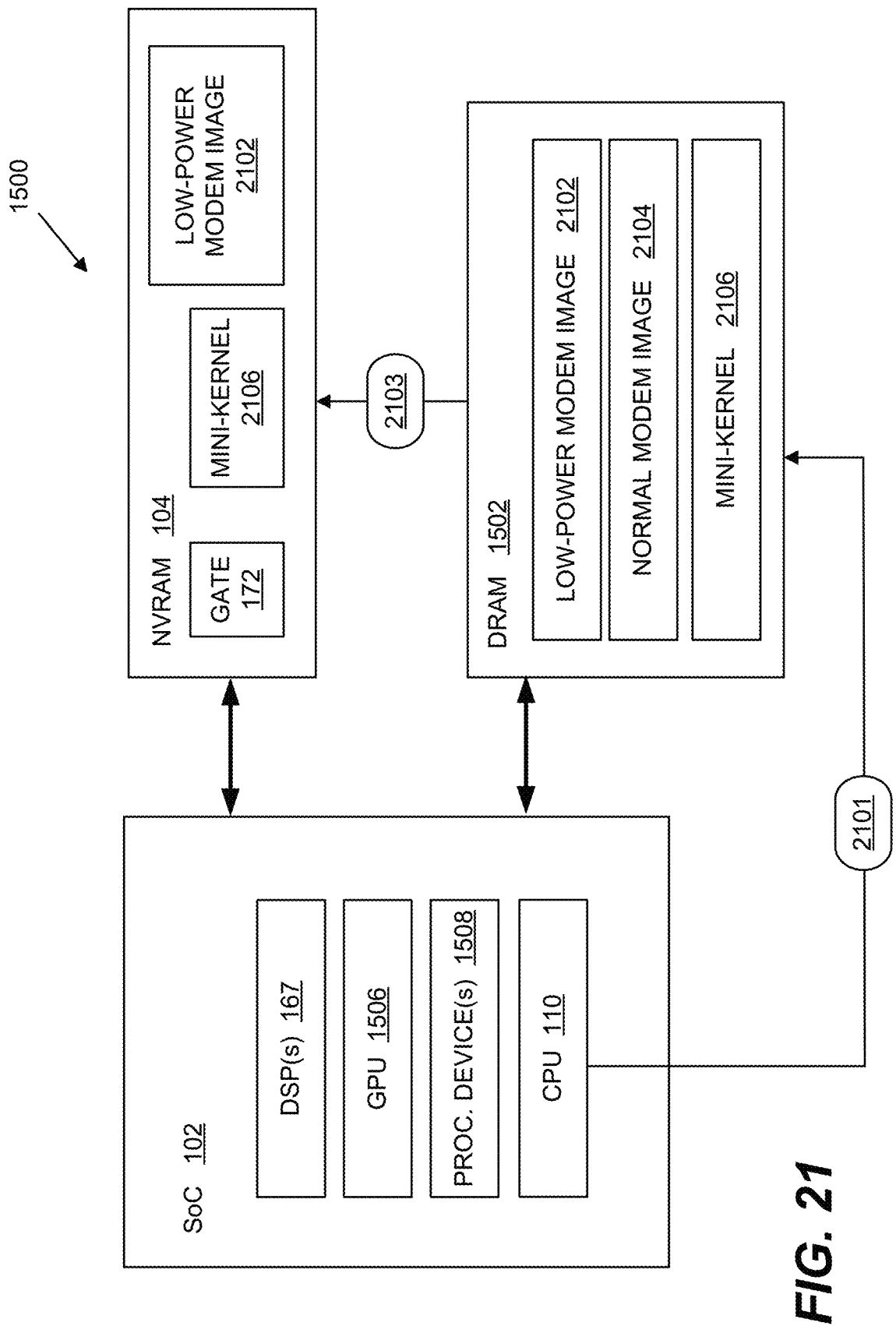
FIG. 21 is a combined block/flow diagram illustrating an exemplary low-power SoC island configuration for the CPU in the system of FIG. 15.
Figure 22:
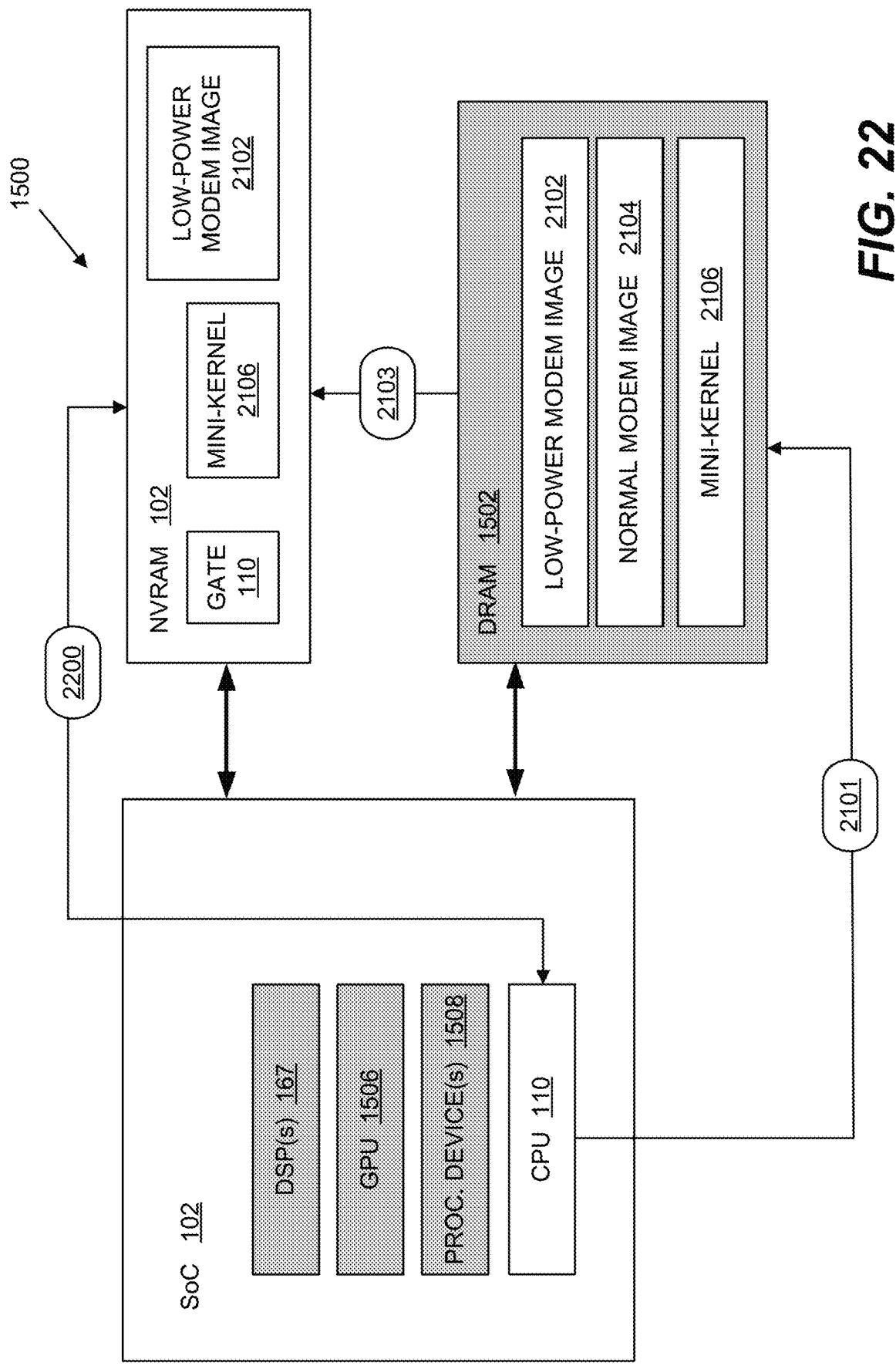
FIG. 22 illustrates the system of FIG. 21 in which only the CPU and the NVRAM are powered up in the low-power SoC island configuration.

FIGS. 21 & 22 illustrate an exemplary low-power SoC island configuration for implementing low-power images for CPU 110. It should be appreciated that isolating CPU 110 in a low-power SoC island configuration may be useful for certain types of use cases. As described above, a reduced-sized version of the software or a subset of the run-time software functions may be identified for the low-power use case. For the CPU, the HLOS may contain a rich feature set to enable many different peripheral devices in different scenarios. This may cause the HLOS program to be big in size to fit into the NVRAM 104 while not all the functions are needed in a low-power use case. In this regard, the HLOS may wake-up periodically to update the file system based on a timer or request from the DSP. For example, it may need the file system driver but may not need the graphic feature. Therefore, a feature stripped-down version of the HLOS program with size optimization (e.g., mini-kernel) may be created for such CPU low-power use cases.

As illustrated in FIG. 21, at step 2101, the CPU 110 may load a low-power model image 2102, a normal model image 2104, and a mini-kernel 2106 to DRAM 1502. When a low-power island configuration is triggered (step 2103), the low-power modem image 2102 and the mini-kernel 2106 is loaded from the DRAM 1502 to the secure NVRAM 104. Referring to FIG. 22, after the low-power mode image 2102 is loaded to the secure NVRAM 104, power may be disabled to the other SoC processing devices (illustrated as being greyed-out). At step 2200, the CPU 110 may execute the low-power modem image 2102 from the secure NVRAM 104.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, NAND flash, NOR flash, M-RAM, P-RAM, R-RAM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Alternative aspects will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

It should be appreciated that one or more of the method steps described herein may be stored in the memory as computer program instructions, such as the modules described above. These instructions may be executed by any suitable processor in combination or in concert with the corresponding module to perform the methods described herein.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, NAND flash, NOR flash, M-RAM, P-RAM, R-RAM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for managing memory access for low-power use cases of a system on chip, the method comprising:
    booting a system on chip (SoC) comprising a plurality of SoC processing devices, the SoC comprising a circuit board with the plurality of SoC processing devices mounted thereon;
    creating a trusted channel to a secure non-volatile random access memory (NVRAM) the secure NVRAM located off-chip relative to the SoC;
    determining a power-saving software program to be executed on the SoC by one of the plurality of SoC processing devices by assessing a hint received from the power-saving software program and assessing a trait about the power-saving software program, each hint corresponding to a fixed value and each trait comprising a measurement made by hardware about the power-saving software program;
    loading a software image associated with the power-saving software program from volatile memory to the secure NVRAM; and
    in response to loading the software image to the secure NVRAM, powering down each of the plurality of SoC processing devices except the one executing the software image from the secure NVRAM.

2. The method of claim 1, wherein the hint comprises one or more of a software image size, a bandwidth, a power value, and a boot speed.

3. The method of claim 1, wherein the software image is loaded to the secure NVRAM from volatile memory comprising a double data rate (DDR) memory electrically coupled to the SoC.

4. The method of claim 3, wherein the software image is loaded to the DDR memory by a central processing unit during runtime or the booting of the SoC.

5. The method of claim 1, wherein the plurality of SoC processing devices comprise one of a central processing unit (CPU), a graphics processing unit (GPU), and a digital signal processor, each mounted on the circuit board.

6. The method of claim 5, wherein the power-saving software program is to be executed by the digital signal processor and, in response to loading the software image to the secure NVRAM, each of the plurality of SoC processing devices are powered down except the digital signal processor.

7. The method of claim 1, wherein the SoC is incorporated in a mobile phone.

8. The method of claim 1, wherein the secure NVRAM comprises a fuse having a pass gate value.

9. A system for managing low-power use cases of a system on chip, the system comprising:
    means for booting a system on chip (SoC) comprising a plurality of SoC processing devices, the SoC comprising a circuit board with the plurality of SoC processing devices mounted thereon;
    means for creating a trusted channel to a secure non-volatile random access memory (NVRAM), the secure NVRAM located off-chip relative to the SoC;
    means for determining a power-saving software program to be executed on the SoC by one of the plurality of SoC processing devices by assessing a hint received from the power-saving software program and assessing a trait about the power-saving software program, each hint corresponding to a fixed value and each trait comprising a measurement made by hardware about the power-saving software program;
    means for loading a software image associated with the power-saving software program from volatile memory to the secure NVRAM; and
    means for powering down each of the plurality of SoC processing devices except the one executing the software image from the secure NVRAM in response to loading the software image to the secure NVRAM.

10. The system of claim 9, wherein the hint comprises one or more of a software image size, a bandwidth, a power value, and a boot speed.

11. The system of claim 9, wherein the software image is loaded to from volatile memory the secure NVRAM from a double data rate (DDR) memory electrically coupled to the SoC.

12. The system of claim 11, wherein the software image is loaded to the DDR memory by a central processing unit during runtime or the booting of the SoC.

13. The system of claim 9, wherein the plurality of SoC processing devices comprise one of a central processing unit (CPU), a graphics processing unit (GPU), and a digital signal processor, each mounted on the circuit board.

14. The system of claim 13, wherein the power-saving software program is to be executed by one of the digital signal processor and the CPU and, in response to loading the software image to the secure NVRAM, each of the plurality of SoC processing devices are powered down except the one of the digital signal processor and the CPU.

15. The system of claim 9, wherein the SoC is incorporated in a mobile phone.

16. The system of claim 9, wherein the secure NVRAM comprises a fuse having a pass gate value.

17. A system for managing memory access for low-power use cases of a system on chip, the system comprising:
    a system on chip (SoC) comprising a plurality of SoC processing devices, the SoC comprising a circuit board with the plurality of SoC processing devices mounted thereon;
    a double data rate (DDR) memory electrically coupled to the SoC;
    a secure non-volatile random access memory (NVRAM) having a fuse with a pass gate value for creating a trusted channel; and
    a low-power use case management module comprising logic configured to:
        determine a power-saving software program to be executed on the SoC by one of the plurality of SoC processing devices by assessing a hint received from the power-saving software program and assessing a trait about the power-saving software program, each hint corresponding to a fixed value and each trait comprising a measurement made by hardware about the power-saving software program;
        load a software image associated with the power-saving software program from the DDR memory to the secure NVRAM; and
        in response to loading the software image to the secure NVRAM, initiating a powering down of each of the plurality of SoC processing devices except the one executing the software image from the secure NVRAM.

18. The system of claim 17, wherein the hint comprises one or more of a software image size, a bandwidth, a power value, and a boot speed.

19. The system of claim 17, wherein the software image is loaded to the DDR memory by a central processing unit during runtime or booting of the SoC.

20. The system of claim 17, wherein the plurality of SoC processing devices comprise one of a central processing unit (CPU), a graphics processing unit (GPU), and a digital signal processor, each mounted on the circuit board.

21. The system of claim 20, wherein the power-saving software program is to be executed by the digital signal processor and, in response to loading the software image to the secure NVRAM, each of the plurality of SoC processing devices are powered down except the digital signal processor.

22. The system of claim 17, wherein the SoC is incorporated in a mobile phone.

23. A computer program embodied in a non-transitory computer-readable medium and executable by a processor for managing memory access for low-power use cases of a system on chip, the computer program comprising logic configured to:
    boot a system on chip (SoC) comprising a plurality of SoC processing devices, the SoC comprising a circuit board with the plurality of SoC processing devices mounted thereon;
    create a trusted channel to a secure non-volatile random access memory (NVRAM) the secure NVRAM located off-chip relative to the SoC;
    determine a power-saving software program to be executed on the SoC by one of the plurality of SoC processing devices by assessing a hint received from the power-saving software program and assessing a trait about the power-saving software program, each hint corresponding to a fixed value and each trait comprising a measurement made by hardware about the power-saving software program;

load a software image associated with the power-saving software program from volatile memory to the secure NVRAM; and in response to loading the software image to the secure NVRAM, power down each of the plurality of SoC processing devices except the one executing the software image from the secure NVRAM.

24. The computer program of claim 23, wherein the plurality of SoC processing devices comprise one of a central processing unit (CPU), a graphics processing unit (GPU), and a digital signal processor.

25. The computer program of claim 23, wherein the power-saving software program is to be executed by the digital signal processor and, in response to loading the software image to the secure NVRAM, each of the plurality of SoC processing devices are powered down except the digital signal processor.

26. The computer program of claim 23, wherein the SoC is incorporated in a mobile phone.

* * * * *